US012079938B2

(12) United States Patent
Baier et al.

(10) Patent No.: US 12,079,938 B2
(45) Date of Patent: Sep. 3, 2024

(54) DYNAMIC COLOCATION OF VIRTUAL CONTENT

(71) Applicant: Magic Leap, Inc., Plantation, FL (US)

(72) Inventors: Paul Andrew Baier, Bundoora (AU); Domingo Noriega-Padilla, Miami, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/723,245

(22) Filed: Apr. 18, 2022

(65) Prior Publication Data

US 2022/0245905 A1 Aug. 4, 2022

Related U.S. Application Data

(63) Continuation of application No. 17/173,125, filed on Feb. 10, 2021, now Pat. No. 11,335,070.

(Continued)

(51) Int. Cl.
*G06T 19/00* (2011.01)
*G02B 27/01* (2006.01)
*G06F 17/16* (2006.01)

(52) U.S. Cl.
CPC .......... *G06T 19/006* (2013.01); *G02B 27/017* (2013.01); *G06F 17/16* (2013.01)

(58) Field of Classification Search
None
See application file for complete search history.

(56) References Cited

U.S. PATENT DOCUMENTS

| 4,852,988 A | 8/1989 | Velez |
| 6,130,670 A | 10/2000 | Porter |

(Continued)

FOREIGN PATENT DOCUMENTS

| CA | 2316473 A1 | 1/2001 |
| CA | 2362895 A1 | 12/2002 |

(Continued)

OTHER PUBLICATIONS

Jacob, R. "Eye Tracking in Advanced Interface Design", Virtual Environments and Advanced Interface Design, Oxford University Press, Inc. (Jun. 1995).

(Continued)

*Primary Examiner* — James A Thompson
*Assistant Examiner* — Kim Thanh T Tran
(74) *Attorney, Agent, or Firm* — Morrison & Foerster LLP

(57) ABSTRACT

Disclosed herein are systems and methods for colocating virtual content. A method may include receiving first persistent coordinate data, second persistent coordinate data, and relational data. A third persistent coordinate data and a fourth persistent coordinate data may be determined based on input received via one or more sensors of a head-wearable device. It can be determined whether the first persistent coordinate data corresponds to the third persistent coordinate data. In accordance with a determination that the first persistent coordinate data corresponds to the third persistent coordinate data, it can be determined whether the second persistent coordinate data corresponds to the fourth persistent coordinate data. In accordance with a determination that the second persistent coordinate data corresponds to the fourth persistent coordinate data, a virtual object can be displayed using the relational data and the second persistent coordinate data via a display of the head-wearable device. In accordance with a determination that the second persistent coordinate data does not correspond to the fourth persistent coordinate data, the virtual object can be displayed using the relational data and the first persistent coordinate data via the display of the head-wearable device. In accordance with a determination that the first persistent coordinate data does not correspond to the third persistent coordinate data, the (Continued)

method may forgo displaying the virtual object via the display of the head-wearable device.

26 Claims, 14 Drawing Sheets

Related U.S. Application Data

(60) Provisional application No. 62/972,541, filed on Feb. 10, 2020.

(56) References Cited

U.S. PATENT DOCUMENTS

| | | |
|---|---|---|
| 6,433,760 B1 | 8/2002 | Vaissie |
| 6,491,391 B1 | 12/2002 | Blum et al. |
| 6,847,336 B1 | 1/2005 | Lemelson |
| 6,943,754 B2 | 9/2005 | Aughey |
| 6,977,776 B2 | 12/2005 | Volkenandt et al. |
| 7,290,216 B1 | 10/2007 | Kawahara et al. |
| 7,347,551 B2 | 3/2008 | Fergason et al. |
| 7,488,294 B2 | 2/2009 | Torch |
| 7,800,614 B2 | 9/2010 | Johnson et al. |
| 8,235,529 B1 | 8/2012 | Raffle |
| 8,253,730 B1 | 8/2012 | Carr |
| 8,275,031 B2 | 9/2012 | Neuman |
| 8,611,015 B2 | 12/2013 | Wheeler |
| 8,638,498 B2 | 1/2014 | Bohn et al. |
| 8,696,113 B2 | 4/2014 | Lewis |
| 8,929,589 B2 | 1/2015 | Publicover et al. |
| 9,010,929 B2 | 4/2015 | Lewis |
| 9,069,554 B2 | 6/2015 | Lioy et al. |
| 9,274,338 B2 | 3/2016 | Robbins et al. |
| 9,292,973 B2 | 3/2016 | Bar-zeev et al. |
| 9,323,325 B2 | 4/2016 | Perez et al. |
| 9,720,505 B2 | 8/2017 | Gribetz et al. |
| 9,811,237 B2 | 11/2017 | Schileru |
| 10,013,053 B2 | 7/2018 | Cederlund et al. |
| 10,025,379 B2 | 7/2018 | Drake et al. |
| 10,528,349 B2 | 1/2020 | Kumar |
| 10,977,858 B2 | 4/2021 | Babu Jd |
| 10,977,868 B2 | 4/2021 | Neeter |
| 11,017,592 B2 | 5/2021 | Babu J D |
| 11,201,953 B2 | 12/2021 | Babu J D et al. |
| 11,295,518 B2 | 4/2022 | Babu J D |
| 11,315,316 B2 | 4/2022 | Babu J D |
| 11,335,070 B2 | 5/2022 | Baier et al. |
| 11,475,644 B2 | 10/2022 | Bailey et al. |
| 11,494,528 B2 | 11/2022 | Bailey et al. |
| 11,699,262 B2 | 7/2023 | Babu J D |
| 11,763,559 B2 | 9/2023 | Wang et al. |
| 11,797,720 B2 | 10/2023 | Bailey et al. |
| 11,861,803 B2 | 1/2024 | Bailey et al. |
| 11,936,733 B2 | 3/2024 | Babu J D et al. |
| 2001/0012018 A1 | 8/2001 | Hayhurst |
| 2002/0163515 A1 | 11/2002 | Sowizral et al. |
| 2002/0172328 A1* | 11/2002 | Dekel .................... A61B 6/12 378/205 |
| 2003/0030597 A1 | 2/2003 | Geist |
| 2003/0076329 A1 | 4/2003 | Beda et al. |
| 2004/0130550 A1 | 7/2004 | Blanco et al. |
| 2004/0130552 A1 | 7/2004 | Duluk et al. |
| 2004/0130579 A1* | 7/2004 | Ishii .................... G06F 3/011 715/848 |
| 2004/0189669 A1 | 9/2004 | David et al. |
| 2005/0182844 A1 | 8/2005 | Johnson et al. |
| 2006/0023158 A1 | 2/2006 | Howell et al. |
| 2006/0122819 A1 | 6/2006 | Carmel et al. |
| 2007/0057952 A1 | 3/2007 | Swedberg et al. |
| 2007/0220168 A1 | 9/2007 | Parsons et al. |
| 2008/0002761 A1 | 1/2008 | Edsall et al. |
| 2008/0122838 A1 | 5/2008 | Hoover et al. |
| 2009/0278852 A1 | 11/2009 | Reese et al. |
| 2009/0282369 A1 | 11/2009 | Jones |
| 2011/0211056 A1 | 9/2011 | Publicover et al. |
| 2011/0213664 A1 | 9/2011 | Osterhout |
| 2012/0021806 A1 | 1/2012 | Maltz |
| 2012/0075343 A1 | 3/2012 | Chen et al. |
| 2012/0249416 A1 | 10/2012 | Maciocci et al. |
| 2013/0012418 A1 | 1/2013 | Tatsumi |
| 2013/0073707 A1 | 3/2013 | Butler et al. |
| 2013/0077147 A1 | 3/2013 | Efimov |
| 2013/0120418 A1 | 5/2013 | Green et al. |
| 2013/0120421 A1 | 5/2013 | Maguire |
| 2013/0127849 A1 | 5/2013 | Marketsmueller et al. |
| 2013/0293468 A1 | 11/2013 | Perez et al. |
| 2013/0324245 A1 | 12/2013 | Harvey et al. |
| 2014/0123184 A1 | 5/2014 | Reisman |
| 2014/0168218 A1 | 6/2014 | Mitrea et al. |
| 2014/0195918 A1 | 7/2014 | Friedlander |
| 2014/0267234 A1 | 9/2014 | Hook et al. |
| 2014/0267291 A1 | 9/2014 | Smyth et al. |
| 2014/0313197 A1 | 10/2014 | Peuhkurinen |
| 2015/0168731 A1 | 6/2015 | Robbins |
| 2015/0199788 A1 | 7/2015 | Wolfe |
| 2015/0248779 A1 | 9/2015 | Lindquist |
| 2016/0072716 A1 | 3/2016 | Chow et al. |
| 2016/0093090 A1 | 3/2016 | Shin et al. |
| 2016/0104452 A1 | 4/2016 | Guan et al. |
| 2016/0293133 A1 | 10/2016 | Dutt |
| 2016/0343164 A1 | 11/2016 | Urbach et al. |
| 2017/0153926 A1 | 6/2017 | Callegari et al. |
| 2017/0236320 A1 | 8/2017 | Gribetz et al. |
| 2017/0352196 A1 | 12/2017 | Chen |
| 2017/0365086 A1 | 12/2017 | Floyd et al. |
| 2018/0114368 A1 | 4/2018 | Marketsmueller |
| 2018/0181198 A1 | 6/2018 | Trotta |
| 2018/0197340 A1* | 7/2018 | Loberg .................... G06T 19/00 |
| 2018/0197341 A1 | 7/2018 | Loberg et al. |
| 2018/0321894 A1* | 11/2018 | Paulovich .......... G02B 27/0172 |
| 2019/0019348 A1 | 1/2019 | Yamamoto et al. |
| 2019/0114802 A1 | 4/2019 | Lazarow |
| 2019/0180506 A1 | 6/2019 | Gebbie |
| 2019/0244426 A1 | 8/2019 | Knoppert et al. |
| 2019/0272674 A1 | 9/2019 | Comer et al. |
| 2019/0392640 A1 | 12/2019 | Qian et al. |
| 2020/0005538 A1 | 1/2020 | Neeter |
| 2020/0051328 A1 | 2/2020 | Mohan et al. |
| 2020/0051337 A1 | 2/2020 | Reynolds et al. |
| 2020/0160601 A1* | 5/2020 | Shreve .................... G06N 5/046 |
| 2020/0225904 A1 | 7/2020 | Cooper et al. |
| 2021/0248827 A1 | 8/2021 | Baier et al. |
| 2021/0256175 A1 | 8/2021 | Bailey et al. |
| 2021/0256261 A1 | 8/2021 | Wang et al. |
| 2021/0256769 A1 | 8/2021 | Bailey et al. |
| 2022/0070278 A1 | 3/2022 | Babu J D et al. |
| 2022/0383634 A1 | 12/2022 | Wang et al. |
| 2023/0014150 A1 | 1/2023 | Bailey et al. |
| 2023/0017752 A1 | 1/2023 | Bailey et al. |
| 2023/0360324 A1 | 11/2023 | Babu J D |
| 2024/0005050 A1 | 1/2024 | Bailey et al. |
| 2024/0087261 A1 | 3/2024 | Bailey |
| 2024/0187488 A1 | 6/2024 | Babu J D |

FOREIGN PATENT DOCUMENTS

| | | |
|---|---|---|
| CA | 2388766 A1 | 12/2003 |
| CN | 103023872 A | 4/2013 |
| CN | 110352085 A | 10/2019 |
| CN | 110476188 A | 11/2019 |
| JP | 2003228721 A | 8/2003 |
| JP | 2004272928 A | 9/2004 |
| JP | 2012503811 A | 2/2012 |
| KR | 20140136367 A | 11/2014 |
| WO | 2010035141 A2 | 4/2010 |
| WO | 2016028293 A1 | 2/2016 |
| WO | 2016198346 A1 | 12/2016 |
| WO | 2018106735 A1 | 6/2018 |
| WO | 2018165039 A1 | 9/2018 |
| WO | WO-2018175335 A1 * | 9/2018 |
| WO | 2018183778 A1 | 10/2018 |
| WO | 2018224847 A2 | 12/2018 |
| WO | 2019074771 A1 | 4/2019 |
| WO | 2019199569 A1 | 10/2019 |

(56) References Cited

FOREIGN PATENT DOCUMENTS

| WO | 2021163224 A1 | 8/2021 |
| WO | 2021163373 A1 | 8/2021 |
| WO | 2021163624 A1 | 8/2021 |
| WO | 2021163626 A1 | 8/2021 |

OTHER PUBLICATIONS

Rolland, J. et al., "High-resolution inset head-mounted display", Optical Society of America, vol. 37, No. 19, Applied Optics, (Jul. 1, 1998).
Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.
Yoshida, A. et al., "Design and Applications of a High Resolution Insert Head Mounted Display", (Jun. 1994).
Notice of Allowance mailed Aug. 5, 2022, for U.S. Appl. No. 17/175,547, filed Feb. 12, 2021, nine pages.
International Preliminary Report on Patentability and Written Opinion mailed Aug. 25, 2022, for PCT Application No. PCT/US2021/017508, filed Feb. 10, 2021, nine pages.
International Preliminary Report on Patentability and Written Opinion mailed Aug. 25, 2022, for PCT Application No. PCT/US2021/017718, filed Feb. 11, 2021, seven pages.
International Preliminary Report on Patentability and Written Opinion mailed Aug. 25, 2022, for PCT Application No. PCT/US2021/018035, filed Feb. 12, 2021, 8 pages.
International Preliminary Report on Patentability and Written Opinion mailed Aug. 25, 2022, for PCT Application No. PCT/US2021/018037, filed Feb. 12, 2021, nine pages.
International Search Report mailed Apr. 22, 2021, for PCT Application No. PCT/US2021/017718, filed Feb. 11, 2021, two pages.
Notice of Allowance mailed Aug. 26, 2022, for U.S. Appl. No. 17/175,467, filed Feb. 12, 2021, eight pages.
Notice of Allowance mailed Jul. 11, 2022, for U.S. Appl. No. 17/174,141 filed Feb. 11, 2021, nine pages.
Extended European Search Report dated Jul. 26, 2021, for EP Application No. 19841636.4, filed Jul. 22, 2019, nine pages.
Final Office Action mailed Dec. 10, 2021, for U.S. Appl. No. 17/174,141 filed Feb. 11, 2021, 14 pages.
Final Office Action mailed Oct. 27, 2020, for U.S. Appl. No. 16/518,891, filed Jul. 22, 2019, fifteen pages.
International Preliminary Report on Patentability and Written Opinion dated Jan. 26, 2021, for PCT Application No. PCT/US2019/042881, filed Jul. 22, 2019, 16 pages.
International Search Report and Written Opinion mailed Apr. 28, 2021, for PCT Application No. PCT/US2021/17508, filed Feb. 10, 2021, 16 pages.
International Search Report and Written Opinion mailed Jun. 15, 2021, for PCT Application No. PCT/US2021/18037, filed Feb. 12, 2021, 17 pages.
International Search Report and Written Opinion mailed May 3, 2021, for PCT Application No. PCT/US2021/18035, filed Feb. 12, 2021, 14 pages.
International Search Report mailed Oct. 2, 2019, for PCT Application No. PCT/US2019/042881, filed Jul. 22, 2019, three pages.
Non-Final Office Action mailed Dec. 15, 2021, for U.S. Appl. No. 17/175,547, filed Feb. 12, 2021, thirteen pages.
Non-Final Office Action mailed Feb. 17, 2022, for U.S. Appl. No. 17/175,467, filed Feb. 12, 2021, 23 pages.
Non-Final Office Action mailed May 14, 2020, for U.S. Appl. No. 16/518,891, filed Jul. 22, 2019, eighteen pages.
Non-Final Office Action mailed Sep. 1, 2021, for US Application No. 17/174, 141 filed Feb. 11, 2021, thirteen pages.
Notice of Allowance mailed Apr. 22, 2021, for U.S. Appl. No. 16/518,891, filed Jul. 22, 2019, nine pages.
Notice of Allowance mailed Aug. 9, 2021, for U.S. Appl. No. 16/518,891, filed Jul. 22, 2019, eight pages.
Notice of Allowance mailed Jan. 20, 2022, for U.S. Appl. No. 17/173,125, filed Feb. 10, 2021, twelve pages.
Notice of Allowance mailed Nov. 23, 2021, for U.S. Appl. No. 17/173,125, filed Feb. 10, 2021, eleven pages.
Shen, Y. et al., "Augmented Reality for Collaborative Product Design and Development", Elsevier, 2009 (Year: 2009).
Youtube. "Augmented Reality—annotating an object", https://www.youtube.com/watch?v=ESOZndNnGh0 (Year: 2019).
Youtube. "Real Object Annotations in Augmented Reality in Product Design", https://www.youtube.com/watch?v=cy8ow0reAfI (Year: 2013).
Non-Final Office Action mailed Mar. 16, 2022, for U.S. Appl. No. 17/174,141, filed Feb. 11, 2021, eighteen pages.
Final Office Action mailed Apr. 8, 2022, for U.S. Appl. No. 17/175,547, filed Feb. 12, 2021, fourteen pages.
Schmalstieg, D. et al. "Bridging Multiple User Interface Dimensions with Augmented Reality", Oct. 2000, In Proceedings IEEE and ACM International Symposium on Augmented Reality (ISAR 2000) pp. 20-29. (Year: 2000).
Chinese Office Action dated Mar. 29, 2023, for CN Application No. 202180028410.5, with English translation, 12 pages.
Chinese Office Action dated May 13, 2023, for CN Application No. 202180028398.8, with English translation, 6 pages.
European Communication dated Jan. 20, 2023, for EP Application No. 19841636.4, filed Jul. 22, 2019, six pages.
Non-Final Office Action mailed Mar. 29, 2023, for U.S. Appl. No. 17/949,989, filed Sep. 21, 2022, ten pages.
Japanese Office Action mailed Jul. 27, 2023, for JP Application No. 2021-503735, with English translation, 13 pages.
Non-Final Office Action mailed Aug. 17, 2023, for U.S. Appl. No. 17/521,740, filed Nov. 8, 2021, fourteen pages.
Schmalstieg, D. et al., (2002). "Distributed Applications for Collaborative Augmented Reality", Proceedings IEEE Virtual Reality 2002 [online], US, IEEE, Mar. 24, 2002, pp. 1-8, URL: https://ieeexplore.ieee.org/stamp/stamp.jsp?tp=&arnumber=996505, retrieved on Jul. 25, 2023.
Non-Final Office Action mailed Jul. 5, 2023, for U.S. Appl. No. 17/944,079, filed Sep. 13, 2022, fourteen pages.
Notice of Allowance mailed Jul. 21, 2023, for U.S. Appl. No. 17/174,141, filed Feb. 11, 2021, seven pages.
Notice of Allowance mailed Jul. 26, 2023, for U.S. Appl. No. 17/949,989, filed Sep. 21, 2022, five pages.
Extended European Search Report dated Jun. 12, 2023, for EP Application No. 21753609.3, nine pages.
Extended European Search Report dated Jun. 9, 2023, for EP Application No. 21753843.8, nine pages.
Chinese Notice of Allowance dated Nov. 13, 2023, for CN Application No. 202180028398.8, with English translation, four pages.
Chinese Office Action dated Oct. 3, 2023, for CN Application No. 202180028410.5, with English translation, eleven pages.
Notice of Allowance mailed Oct. 16, 2023, for U.S. Appl. No. 17/944,079, filed Sep. 13, 2022, eight pages.
Chinese Notice of Allowance dated Feb. 9, 2024, for CN Application No. 202180028410.5, with English translation, four pages.
Chinese Office Action dated Feb. 22, 2024, for CN Application No. 201980055804.2 with English translation, eleven pages.
Japanese Office Action mailed Jan. 12, 2024, for JP Application No. 2021-503735, with English translation, six pages.
Non-Final Office Action mailed Feb. 22, 2024, for U.S. Appl. No. 17/887,255, filed Aug. 12, 2022, twenty- four pages.
Notice of Allowance mailed Jan. 16, 2024, for U.S. Appl. No. 17/521,740, filed Nov. 8, 2021, seven pages.
Non-Final Office Action mailed Apr. 10, 2024, for U.S. Appl. No. 18/468,629, filed Sep. 15, 2023, thirteen pages.
Extended European Search Report dated Jul. 6, 2023, for EP Application No. 21754096.2, eight pages.
Extended European Search Report dated Jun. 30, 2023, for EP Application No. 21753304.1, nine pages.
Australian Office Action mailed Dec. 23, 2021, for AU Patent Application No. 2018243460, three pages.

(56) References Cited

OTHER PUBLICATIONS

Australian Office Action mailed Oct. 21, 2022, for AU Patent Application No. 2018243460, two pages.
Canadian Office Action dated Mar. 28, 2024, for CA Application No. 3,058,421, four pages.
Chinese Notice of Allowance dated Jan. 10, 2024, for CN Application No. 201880023286.1, with English translation, four pages.
Chinese Office Action dated Feb. 8, 2024, for CN Application No. 201980051078.7, with English translation, 19 pages.
Chinese Office Action dated Jul. 24, 2023, for CN Application No. 201880023286.1, with English translation, 5 pages.
Chinese Office Action dated Mar. 7, 2023, for CN Application No. 201880023286.1, with English translation, 17 pages.
Eikel, B. et al., "Preprocessed Global Visibility for Real-Time Rendering on Low-End Hardware," Nov. 29, 2010, ICIAP: International Conference on Image Analysis and Processing, 17th International Conference, Naples, Italy, Sep. 9-13, 2013. Proceedings; [lecture notes in computer science; Lect.Notes computer], Springer, Berlin, Heidelberg, pp. 622-633* the whole document*.
European Office Action dated Nov. 2, 2023, for EP Application No. 18778218.0, nine pages.
European Search Report dated Aug. 23, 2021, for EP Application No. 19823464.3, twelve pages.
Final Office Action mailed Aug. 25, 2020, for U.S. Appl. No. 15/940,892, filed Mar. 29, 2018, 41 pages.
Final Office Action mailed Aug. 25, 2020, for U.S. Appl. No. 16/011,413, filed Jun. 18, 2018, 21 pages.
Final Office Action mailed Dec. 4, 2019, for U.S. Appl. No. 15/940,892, filed Mar. 29, 2018, 37 pages.
Final Office Action mailed Dec. 4, 2019, for U.S. Appl. No. 16/011,413, filed Jun. 18, 2018, 15 pages.
Indian Office Action dated Feb. 2, 2022, for IN Application No. 201947041612, with English translation, 4 pages.
International Preliminary Report on Patentability mailed Dec. 30, 2020, for PCT Application No. PCT/US2019/037811 filed on Jun. 18, 2019, eight pages.
International Search Report and Written Opinion mailed Sep. 9, 2019, for PCT Application No. PCT/US19/37811 filed on Jun. 18, 2019, fourteen pages.
International Search Report dated Jul. 30, 2018, for PCT Application No. PCT/US2018/25298 filed on Mar. 29, 2018, four pages.
Israeli Notice of Allowance dated Feb. 23, 2023, for IL Application No. 269545, with English translation, 7 pages.
Israeli Notice of Allowance dated Nov. 29, 2023, for IL Application No. 303169, four pages.
Israeli Office Acton dated Jan. 16, 2022, for IL Application No. 269545, with English translation, 9 pages.
Japanese Notice of Allowance mailed Nov. 30, 2023, for JP Application No. 2020-570684, with English translation, 7 pages.
Japanese Notice of Allowance mailed Sep. 27, 2022, for JP Application No. 2019-553094, with English translation, 6 pages.
Japanese Office Action mailed Aug. 21, 2023, for JP Application No. 2020-570684; with English translation, 5 pages.
Japanese Office Action mailed Dec. 12, 2023, for JP Application No. 2022-176196, with English translation, four pages.
Japanese Office Action mailed Feb. 14, 2022, for JP Application No. 2019553094, with English translation, 14 pages.
Korean Notice of Allowance dated Dec. 13, 2023, for KR Application No. 10-2019-7031887, with English translation, 4 pages.
Korean Office Action dated Jun. 2, 2023, for KR Application No. 10-2019-7031887, with English translation, 35 pages.
Kurillo, G. et al., "Teleimmersive 3D Collaborative Environment for Cyberarchaeology," computer vision and pattern recognition workshops (CVPRW), 2010 IEEE computer society conference on, IEEE, Piscataway, NJ, USA, Jun. 13, 2010 (Jun. 13, 2010), pp. 23-28.
Non-Final Office Action mailed Dec. 18, 2023, for U.S. Appl. No. 18/314,075, filed May 8, 2023, 15 pages.
Non-Final Office Action mailed Jun. 20, 2019, for U.S. Appl. No. 15/940,892, filed Mar. 29, 2018, 34 pages.
Non-Final Office Action mailed Jun. 25, 2019, for U.S. Appl. No. 16/011,413, filed Jun. 18, 2018, 14 pages.
Non-Final Office Action mailed Mar. 24, 2020, for U.S. Appl. No. 15/940,892, filed Mar. 29, 2018, 38 pages.
Non-Final Office Action mailed Mar. 24, 2020, for U.S. Appl. No. 16/011,413, filed Jun. 18, 2018, 18 pages.
Non-Final Office Action mailed Oct. 15, 2021, for U.S. Appl. No. 17/236,971, filed Apr. 21, 2021, 13 pages.
Non-Final Office Action mailed Oct. 27, 2022, for U.S. Appl. No. 17/678,332, filed Feb. 23, 2022, 12 pages.
Non-Final Office Action mailed Sep. 16, 2021, for U.S. Appl. No. 17/195,393, filed Mar. 8, 2021, 14 pages.
Notice of Allowance mailed Dec. 9, 2020, for U.S. Appl. No. 16/011,413, filed Jun. 18, 2018, 9 pages.
Notice of Allowance mailed Feb. 11, 2022, for U.S. Appl. No. 17/236,971, filed Apr. 21, 2021, 8 pages.
Notice of Allowance mailed Jan. 25, 2021, for U.S. Appl. No. 15/940,892, filed Mar. 29, 2018, 8 pages.
Notice of Allowance mailed Jan. 25, 2022, for U.S. Appl. No. 17/195,393, filed Mar. 8, 2021, 8 pages.
Notice of Allowance mailed Mar. 22, 2023, for U.S. Appl. No. 17/678,332, filed Feb. 23, 2022, 7 pages.
Notice of Allowance mailed May 1, 2024, for U.S. Appl. No. 18/314,075, filed May 8, 2023, 8 pages.
Japanese Notice of Allowance mailed May 30, 2024, for JP Application No. 2021-503735, with English translation, six pages.
Japanese Notice of Allowance mailed May 30, 2024, for JP Application No. 2022-176196, with English translation, six pages.
Extended European Search Report dated Jun. 7, 2024, for EP Application No. 24165773.3, seven pages.
Japanese Office Action mailed May 2, 2024, for JP Application No. 2022-548903, with English translation, five pages.

* cited by examiner

DYNAMIC COLOCATION OF VIRTUAL CONTENT

CROSS-REFERENCE TO RELATED APPLICATIONS

This application is a continuation of U.S. patent application Ser. No. 17/173,125, filed Feb. 10, 2021, which claims benefit of U.S. Provisional Application No. 62/972,541, filed Feb. 10, 2020, the contents of which are incorporated herein by reference in their entirety.

FIELD

This disclosure relates in general to systems and methods for displaying virtual content to a user, and in particular to systems and methods for displaying virtual content to a user in a mixed reality environment.

BACKGROUND

Virtual environments are ubiquitous in computing environments, finding use in video games (in which a virtual environment may represent a game world); maps (in which a virtual environment may represent terrain to be navigated); audio simulations (in which a virtual environment may simulate a real environment); digital storytelling (in which virtual characters may interact with each other in a virtual environment); and many other applications. Modern computer users are generally comfortable perceiving, and interacting with, virtual environments. However, users' experiences with virtual environments can be limited by the technology for presenting virtual environments. For example, conventional displays (e.g., 2D display screens) and audio systems (e.g., fixed speakers) may be unable to realize a virtual environment in ways that create a compelling, realistic, and immersive experience.

Virtual reality ("VR"), augmented reality ("AR"), mixed reality ("MR"), and related technologies (collectively, "XR") share an ability to present, to a user of an XR system, sensory information corresponding to a virtual environment represented by data in a computer system. This disclosure contemplates a distinction between VR, AR, and MR systems (although some systems may be categorized as VR in one aspect (e.g., a visual aspect), and simultaneously categorized as AR or MR in another aspect (e.g., an audio aspect)). As used herein, VR systems present a virtual environment that replaces a user's real environment in at least one aspect; for example, a VR system could present the user with a view of the virtual environment while simultaneously obscuring his or her view of the real environment, such as with a light-blocking head-mounted display. Similarly, a VR system could present the user with audio corresponding to the virtual environment, while simultaneously blocking (attenuating) audio from the real environment.

VR systems may experience various drawbacks that result from replacing a user's real environment with a virtual environment. One drawback is a feeling of motion sickness that can arise when a user's field of view in a virtual environment no longer corresponds to the state of his or her inner ear, which detects one's balance and orientation in the real environment (not a virtual environment). Similarly, users may experience disorientation in VR environments where their own bodies and limbs (views of which users rely on to feel "grounded" in the real environment) are not directly visible. Another drawback is the computational burden (e.g., storage, processing power) placed on VR systems which must present a full 3D virtual environment, particularly in real-time applications that seek to immerse the user in the virtual environment. Similarly, such environments may need to reach a very high standard of realism to be considered immersive, as users tend to be sensitive to even minor imperfections in virtual environments—any of which can destroy a user's sense of immersion in the virtual environment. Further, another drawback of VR systems is that such applications of systems cannot take advantage of the wide range of sensory data in the real environment, such as the various sights and sounds that one experiences in the real world. A related drawback is that VR systems may struggle to create shared environments in which multiple users can interact, as users that share a physical space in the real environment may not be able to directly see or interact with each other in a virtual environment.

As used herein, AR systems present a virtual environment that overlaps or overlays the real environment in at least one aspect. For example, an AR system could present the user with a view of a virtual environment overlaid on the user's view of the real environment, such as with a transmissive head-mounted display that presents a displayed image while allowing light to pass through the display into the user's eye. Similarly, an AR system could present the user with audio corresponding to the virtual environment, while simultaneously mixing in audio from the real environment. Similarly, as used herein, MR systems present a virtual environment that overlaps or overlays the real environment in at least one aspect, as do AR systems, and may additionally allow that a virtual environment in an MR system may interact with the real environment in at least one aspect. For example, a virtual character in a virtual environment may toggle a light switch in the real environment, causing a corresponding light bulb in the real environment to turn on or off. As another example, the virtual character may react (such as with a facial expression) to audio signals in the real environment. By maintaining presentation of the real environment, AR and MR systems may avoid some of the aforementioned drawbacks of VR systems; for instance, motion sickness in users is reduced because visual cues from the real environment (including users' own bodies) can remain visible, and such systems need not present a user with a fully realized 3D environment in order to be immersive. Further, AR and MR systems can take advantage of real world sensory input (e.g., views and sounds of scenery, objects, and other users) to create new applications that augment that input.

In addition to single user applications, XR systems may benefit from multi-user environments. Because AR and/or MR systems blend real world environments with virtual environments, users of XR systems may often reside in the same real world space. To successfully blur the line between real content and virtual content, it can be beneficial for users of XR systems to see the same virtual content in the same position as other users of XR systems inhabiting the same real world space. Virtual object colocation (i.e., when multiple users perceive the same virtual object to be at the same location as if multiple users were looking at the same real object) can allow users to see and experience shared virtual content in the same way that users see and experience shared real content. Virtual object colocation can enable productivity and immersion as users are able to share the same mixed reality experience. Enabling XR systems to display a virtual object in the same place across multiple user and/or XR systems allows users to interact with other users while remaining immersed in a mixed reality environment.

XR systems can offer a uniquely heightened sense of immersion and realism by combining virtual visual and audio cues with real sights and sounds. Accordingly, it is desirable in some XR systems to present a virtual environment that enhances, improves, or alters a corresponding real environment. This disclosure relates to XR systems that enable consistent placement of virtual objects across multiple XR systems.

BRIEF SUMMARY

Examples of the disclosure describe systems and methods for colocating virtual content. According to examples of the disclosure, a method may include receiving first persistent coordinate data, second persistent coordinate data, and relational data. A third persistent coordinate data and a fourth persistent coordinate data may be determined based on input received via one or more sensors of a head-wearable device. It can be determined whether the first persistent coordinate data corresponds to the third persistent coordinate data. In accordance with a determination that the first persistent coordinate data corresponds to the third persistent coordinate data, it can be determined whether the second persistent coordinate data corresponds to the fourth persistent coordinate data. In accordance with a determination that the second persistent coordinate data corresponds to the fourth persistent coordinate data, a virtual object can be displayed using the relational data and the second persistent coordinate data via a display of the head-wearable device. In accordance with a determination that the second persistent coordinate data does not correspond to the fourth persistent coordinate data, the virtual object can be displayed using the relational data and the first persistent coordinate data via the display of the head-wearable device. In accordance with a determination that the first persistent coordinate data does not correspond to the third persistent coordinate data, the method may forgo displaying the virtual object via the head-wearable device.

DETAILED DESCRIPTION

Figure 1A:
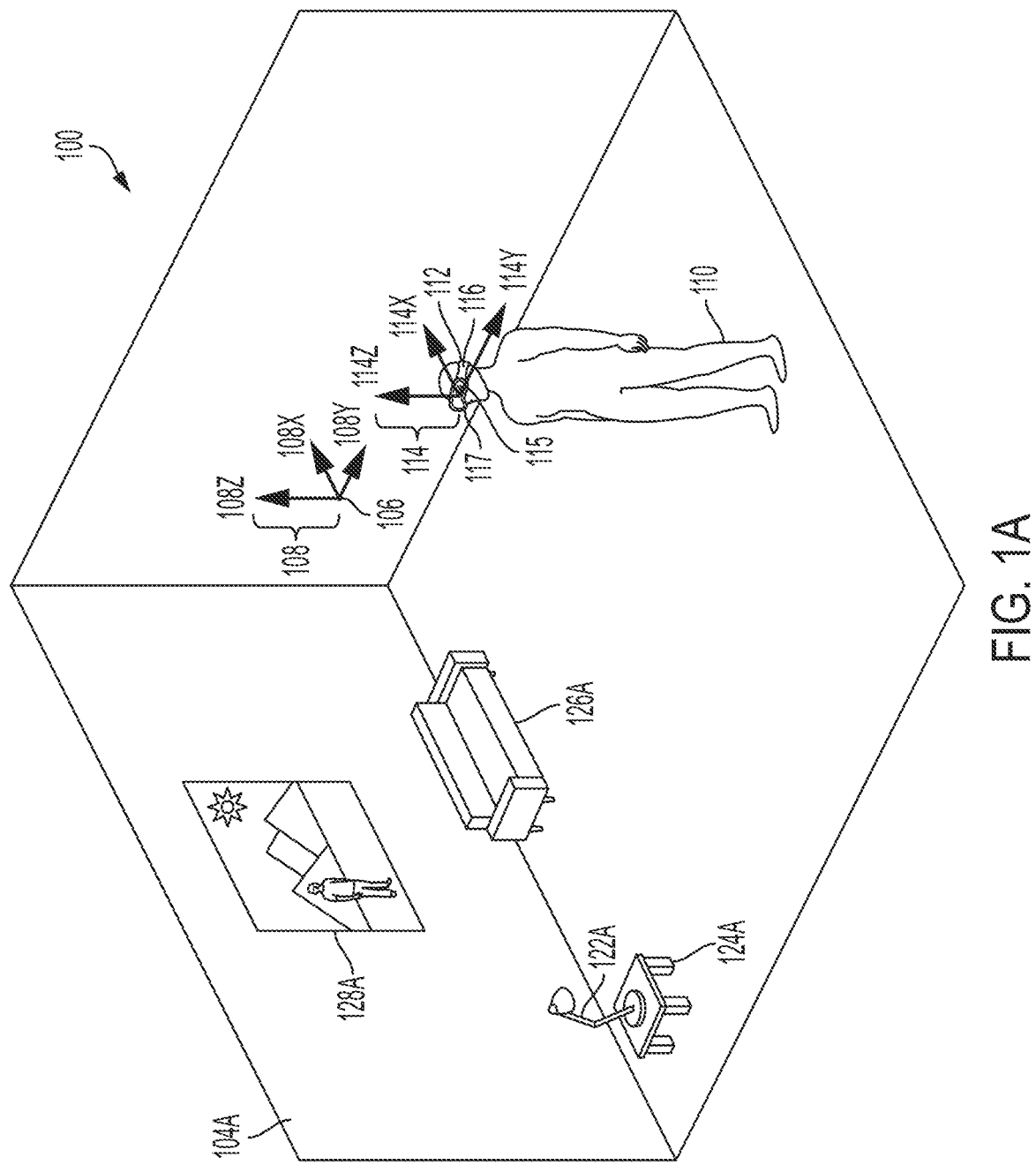
FIGS. 1A-1C illustrate an example mixed reality environment, according to some embodiments.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Mixed Reality Environment

Like all people, a user of a mixed reality system exists in a real environment that is, a three-dimensional portion of the "real world," and all of its contents, that are perceptible by the user. For example, a user perceives a real environment using one's ordinary human senses sight, sound, touch, taste, smell—and interacts with the real environment by moving one's own body in the real environment. Locations in a real environment can be described as coordinates in a coordinate space; for example, a coordinate can include latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input, to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user.

A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include only some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists only as a computational structure, a user cannot directly perceive a virtual environment using one's ordinary senses. Instead, a user can perceive a virtual environment only indirectly, as presented to the user, for example by a display, speakers, haptic output devices, etc. Similarly, a user cannot directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A mixed reality system can present to the user, for example using a transmissive display and/or one or more speakers (which may, for example, be incorporated into a wearable head device), a mixed reality environment ("MRE") that combines aspects of a real environment and a virtual environment. In some embodiments, the one or more speakers may be external to the head-mounted wearable unit. As used herein, an MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In an MRE, a virtual object (e.g., in a virtual environment associated with the MRE) can correspond to a real object (e.g., in a real environment associated with the MRE). For instance, if the real environment of an MRE includes a real lamp post (a real object) at a location coordinate, the virtual environment of the MRE may include a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may include a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of an MRE, not all real objects in a real environment may be associated with a corresponding virtual object. Likewise, in some examples of an MRE, not all virtual objects in a virtual environment may be associated with a corresponding real object. That is, some virtual objects may solely in a virtual environment of an MRE, without any real-world counterpart.

In some examples, virtual objects may have characteristics that differ, sometimes drastically, from those of corresponding real objects. For instance, while a real environment in an MRE may include a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

Compared to VR systems, which present the user with a virtual environment while obscuring the real environment, a mixed reality system presenting an MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted above, a user cannot directly perceive or interact with a virtual environment—a user of an MR system may find it intuitive and natural to interact with a virtual object by seeing, hearing, and touching a corresponding real object in his or her own real environment. This level of interactivity can heighten a user's feelings of immersion, connection, and engagement with a virtual environment. Similarly, by simultaneously presenting a real environment and a virtual environment, mixed reality systems can reduce negative psychological feelings (e.g., cognitive dissonance) and negative physical feelings (e.g., motion sickness) associated with VR systems. Mixed reality systems further offer many possibilities for applications that may augment or alter our experiences of the real world.

FIG. 1A illustrates an example real environment 100 in which a user 110 uses a mixed reality system 112. Mixed reality system 112 may include a display (e.g., a transmissive display) and one or more speakers, and one or more sensors (e.g., a camera), for example as described below. The real environment 100 shown includes a rectangular room 104A, in which user 110 is standing; and real objects 122A (a lamp), 124A (a table), 126A (a sofa), and 128A (a painting). Room 104A further includes a location coordinate 106, which may be considered an origin of the real environment 100. As shown in FIG. 1A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 112 was powered on. In some embodiments, the origin point 106 of the environment/world coordinate system 108 may be reset during operation. In some examples, user 110 may be considered a real object in real environment 100; similarly, user 110's body parts (e.g., hands, feet) may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 112 is located. The origin point 115 of the user/listener/head coordinate system 114 may be defined relative to one or more components of the mixed reality system 112. For example, the origin point 115 of the user/listener/head coordinate system 114 may be defined relative to the display of the mixed reality system 112 such as during initial calibration of the mixed reality system 112. A matrix (which may include a translation matrix and a Quaternion matrix or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a Quaternion matrix or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the user's head, or to a head-mounted device, for example, relative to the environment/world coordinate system 108. Using Simultaneous Localization and Mapping (SLAM), visual odometry, or other techniques, a transformation between user coordinate system 114 and environment coordinate system 108 can be determined and updated in real-time.

Figure 1B:
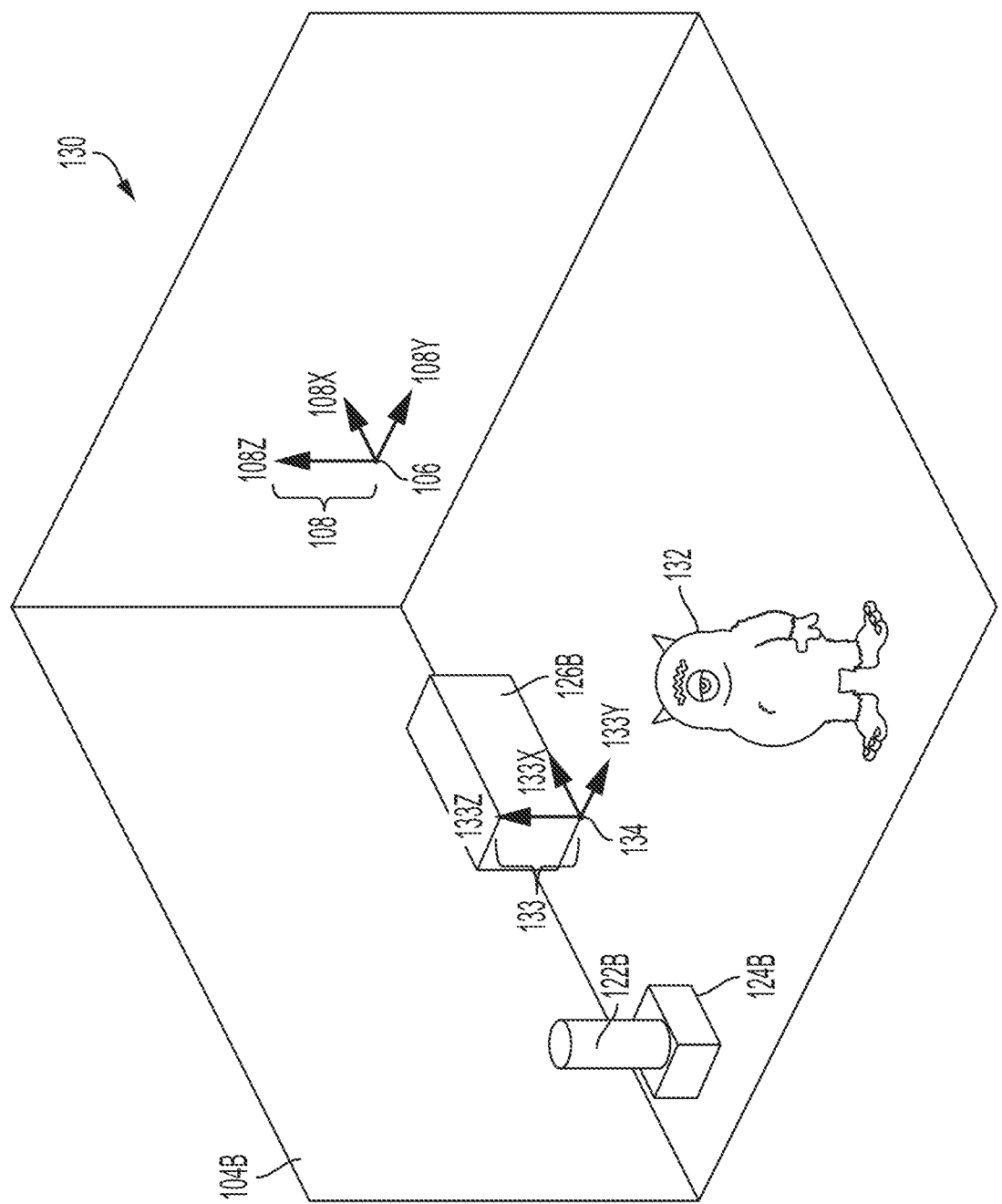

FIG. 1B illustrates an example virtual environment 130 that corresponds to real environment 100. The virtual environment 130 shown includes a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, 126A. Virtual environment 130 additionally includes a virtual monster 132, which does not correspond to any real object in real environment 100. Real object 128A in real environment 100 does not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/with respect to one or more real objects, such as the real object 126A. A matrix (which may include a translation matrix and a Quaternion matrix or other rotation matrix), or other suitable representation can characterize a transformation between the persistent coordinate system 133 space and the environment/world coordinate system 108 space. In some embodiments, each of the virtual objects 122B, 124B, 126B, and 132 may have their own persistent coordinate point relative to the origin point 134 of the persistent coordinate system 133. In some embodiments, there may be multiple persistent coordinate systems and each of the virtual objects 122B, 124B, 126B, and 132 may have their own persistent coordinate point relative to one or more persistent coordinate systems.

Persistent coordinate data may be coordinate data that persists relative to a physical environment. Persistent coordinate data may be used by MR systems (e.g., MR system 112, 200) to place persistent virtual content, which may not be tied to movement of a display on which the virtual object is being displayed. For example, a two-dimensional screen may only display virtual objects relative to a position on the screen. As the two-dimensional screen moves, the virtual content may move with the screen. In some embodiments, persistent virtual content may be displayed in a corner of a room. An MR user may look at the corner, see the virtual content, look away from the corner (where the virtual content may no longer be visible), and look back to see the virtual content in the corner (similar to how a real object may behave).

In some embodiments, an instance of persistent coordinate data (e.g., a persistent coordinate system) can include an origin point and three axes. For example, a persistent coordinate system may be assigned to a center of a room by an MR system. In some embodiments, a user may move around the room, out of the room, re-enter the room, etc., and the persistent coordinate system may remain at the center of the room (e.g., because it persists relative to the physical environment). In some embodiments, a virtual object may be displayed using a transform to persistent coordinate data, which may enable displaying persistent virtual content. In some embodiments, an MR system may use simultaneous localization and mapping to generate persistent coordinate data (e.g., the MR system may assign a persistent coordinate system to a point in space). In some embodiments, an MR system may map an environment by generating persistent coordinate data at regular intervals (e.g., an MR system may assign persistent coordinate systems in a grid where persistent coordinate systems may be at least within five feet of another persistent coordinate system).

In some embodiments, persistent coordinate data may be generated by an MR system and transmitted to a remote server. In some embodiments, a remote server may be configured to receive persistent coordinate data. In some embodiments, a remote server may be configured to synchronize persistent coordinate data from multiple observation instances. For example, multiple MR systems may map the same room with persistent coordinate data and transmit that data to a remote server. In some embodiments, the remote server may use this observation data to generate canonical persistent coordinate data, which may be based on the one or more observations. In some embodiments, canonical persistent coordinate data may be more accurate and/or reliable than a single observation of persistent coordinate data. In some embodiments, canonical persistent coordinate data may be transmitted to one or more MR systems. For example, an MR system may use image recognition and/or location data to recognize that it is located in a room that has corresponding canonical persistent coordinate data (e.g., because other MR systems have previously mapped the room). In some embodiments, the MR system may receive canonical persistent coordinate data corresponding to its location from a remote server.

With respect to FIGS. 1A and 1B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a Quaternion matrix or other rotation matrix), or other suitable representation can characterize a transformation between a real environment coordinate space and a virtual environment coordinate space.

Figure 1C:
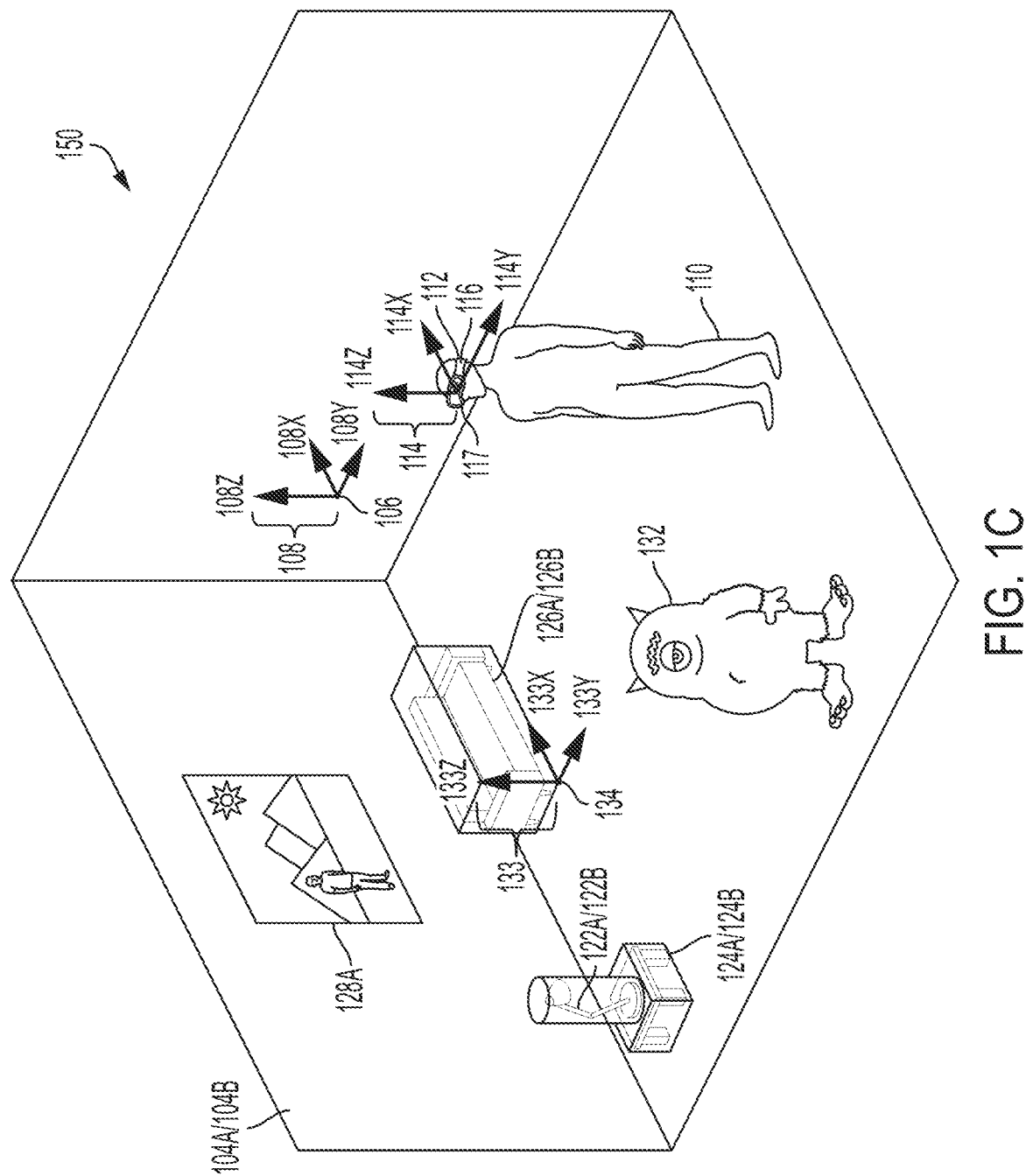

FIG. 1C illustrates an example MRE 150 that simultaneously presents aspects of real environment 100 and virtual environment 130 to user 110 via mixed reality system 112. In the example shown, MRE 150 simultaneously presents user 110 with real objects 122A, 124A, 126A, and 128A from real environment 100 (e.g., via a transmissive portion of a display of mixed reality system 112); and virtual objects 122B, 124B, 126B, and 132 from virtual environment 130 (e.g., via an active display portion of the display of mixed reality system 112). As above, origin point 106 acts as an origin for a coordinate space corresponding to MRE 150, and coordinate system 108 defines an x-axis, y-axis, and z-axis for the coordinate space.

In the example shown, mixed reality objects include corresponding pairs of real objects and virtual objects (i.e., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described above may also incorporate audio aspects. For instance, in MRE 150, virtual monster 132 could be associated with one or more audio signals, such as a footstep sound effect that is generated as the monster walks around MRE 150. As described further below, a processor of mixed reality system 112 can compute an audio signal corresponding to a mixed and processed composite of all such sounds in MRE 150, and present the audio signal to user 110 via one or more speakers included in mixed reality system 112 and/or one or more external speakers.

Example Mixed Reality System

Example mixed reality system 112 can include a wearable head device (e.g., a wearable augmented reality or mixed reality head device) comprising a display (which may include left and right transmissive displays, which may be near-eye displays, and associated components for coupling light from the displays to the user's eyes); left and right speakers (e.g., positioned adjacent to the user's left and right ears, respectively); an inertial measurement unit (IMU)(e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic, LIDAR, EOG, GPS, magnetic). In addition, mixed reality system 112 may incorporate networking features (e.g., Wi-Fi capability) to communicate with other devices and systems, including other mixed reality systems. Mixed reality system 112 may further include a battery (which may be mounted in an auxiliary unit, such as a belt pack designed to be worn around a user's waist), a processor, and a memory. The wearable head device of mixed reality system 112 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 112 may also include a handheld controller 300, and/or an auxiliary unit 320, which may be a wearable beltpack, as described further below.

Figure 2A:
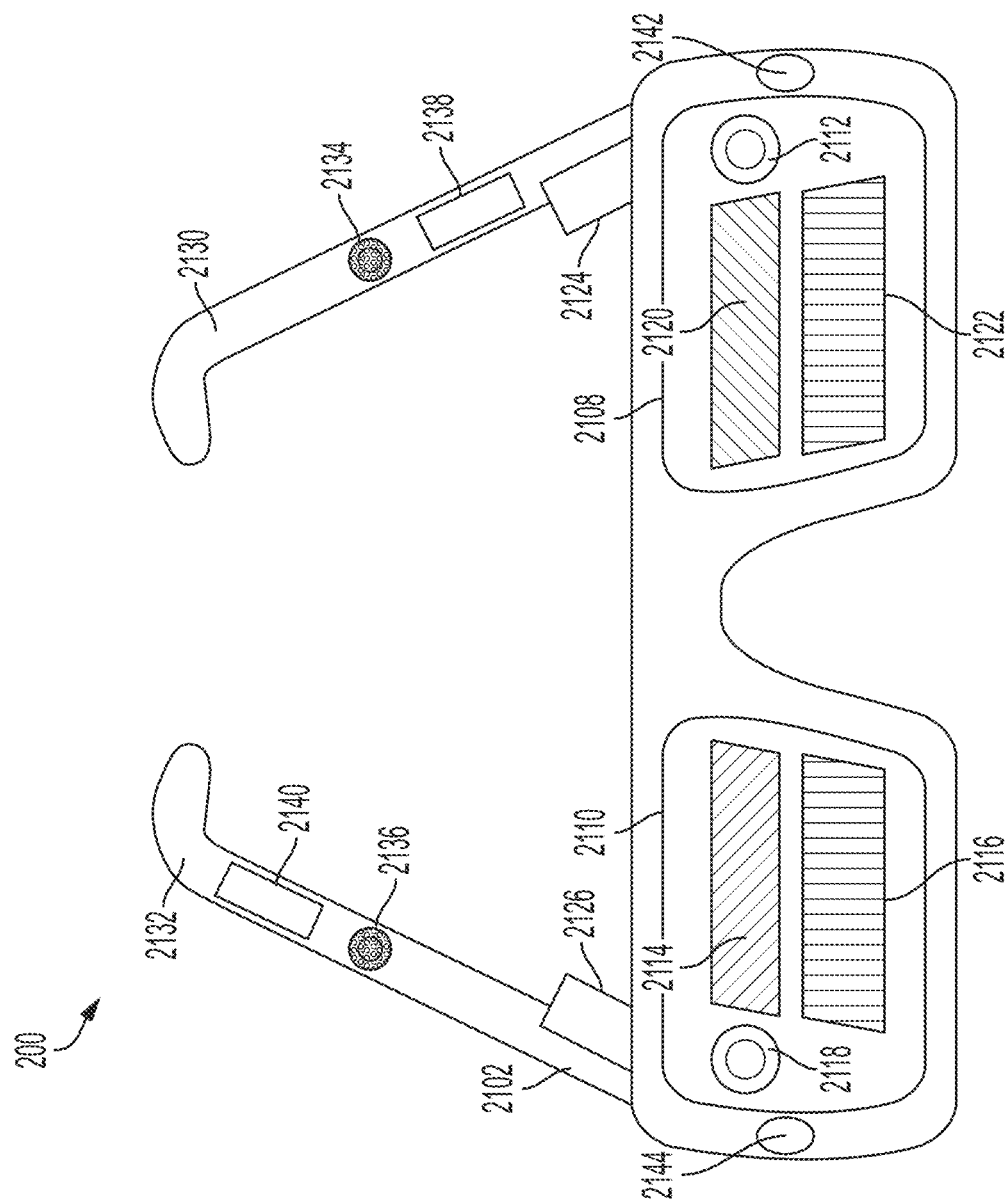
FIGS. 2A-2D illustrate components of an example mixed reality system that can be used to generate and interact with a mixed reality environment, according to some embodiments.
Figure 2B:
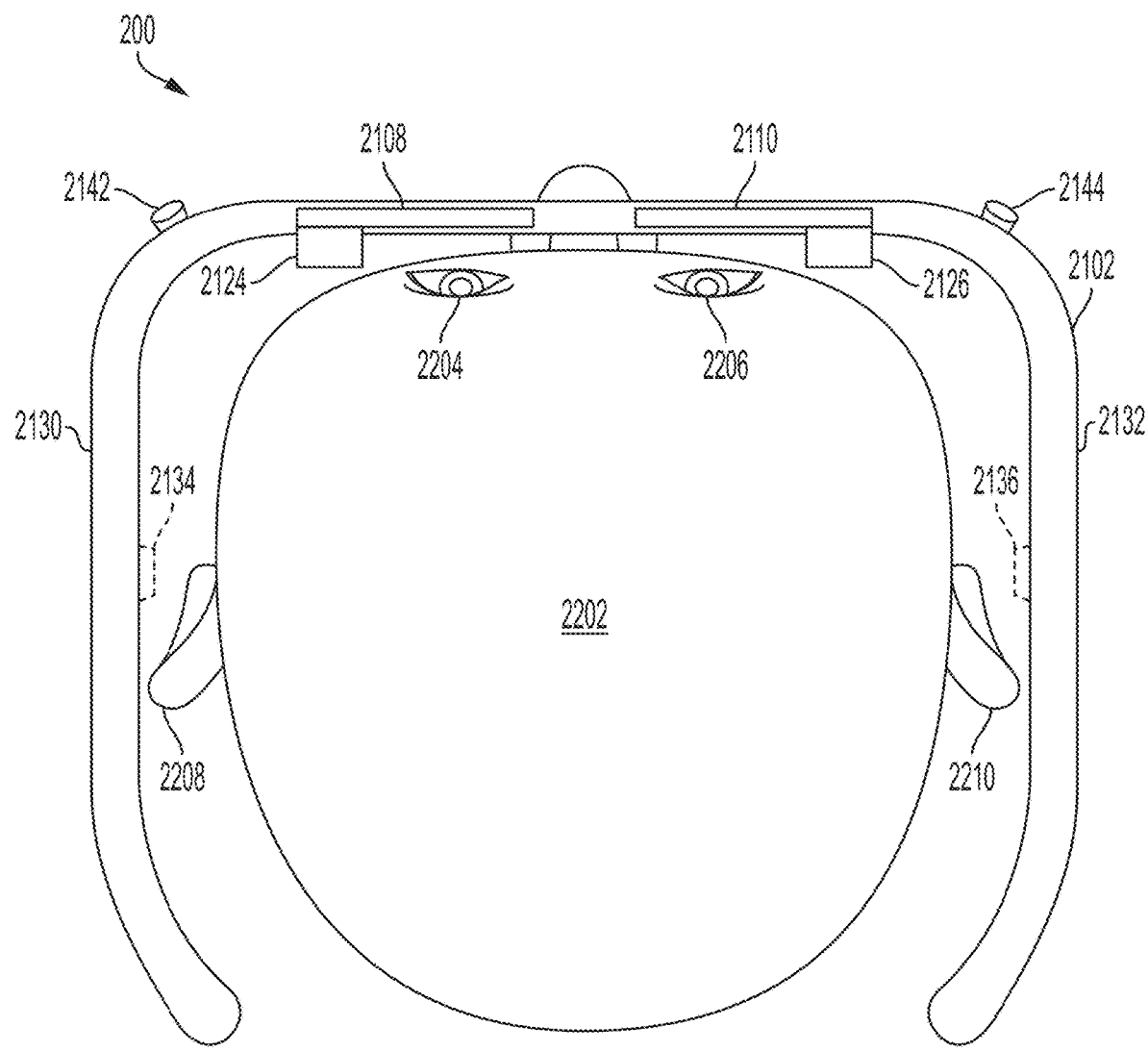
Figure 2C:
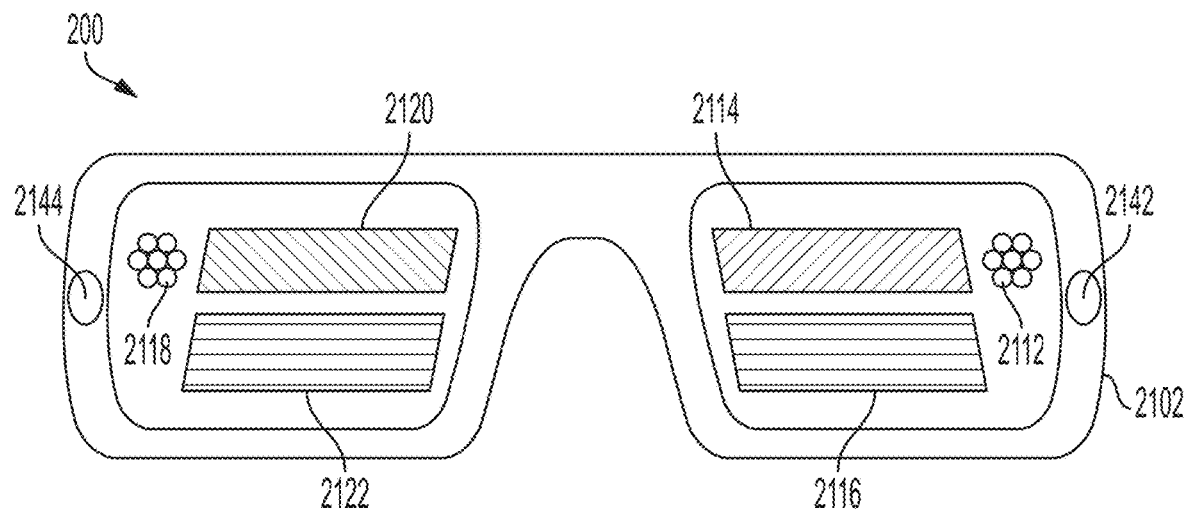
Figure 2D:
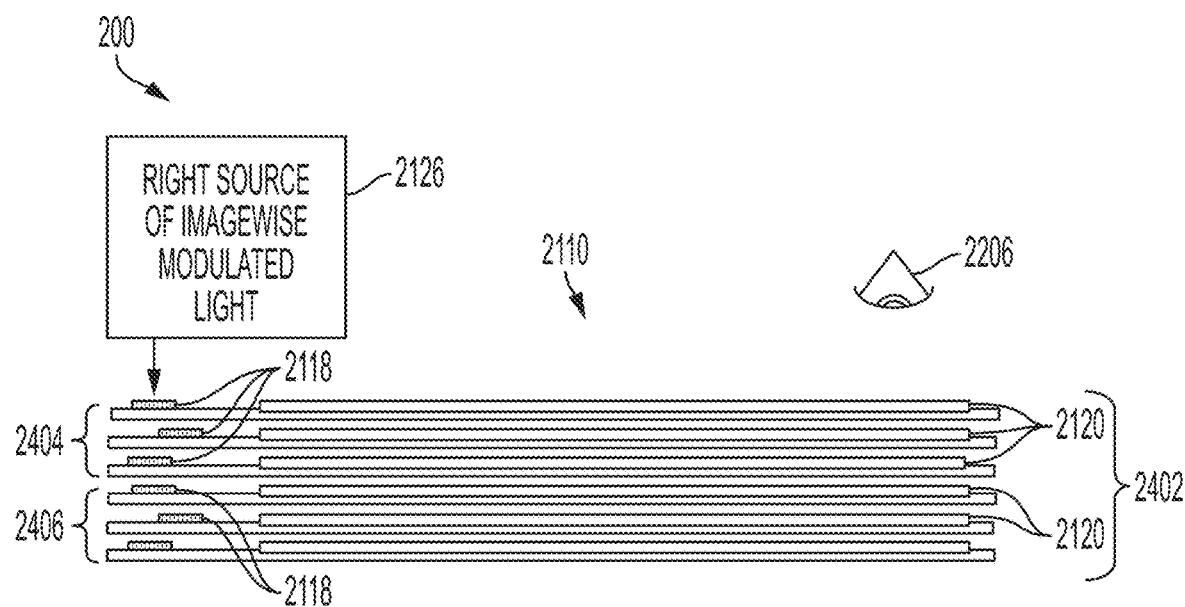

FIGS. 2A-2D illustrate components of an example mixed reality system 200 (which may correspond to mixed reality system 112) that may be used to present an MRE (which may correspond to MRE 150), or other virtual environment, to a user. FIG. 2A illustrates a perspective view of a wearable head device 2102 included in example mixed reality system 200. FIG. 2B illustrates a top view of wearable head device 2102 worn on a user's head 2202. FIG. 2C illustrates a front view of wearable head device 2102. FIG. 2D illustrates an edge view of example eyepiece 2110 of wearable head device 2102. As shown in FIGS. 2A-2C, the example wearable head device 2102 includes an example left eyepiece (e.g., a left transparent waveguide set eyepiece) 2108 and an example right eyepiece (e.g., a right transparent waveguide set eyepiece) 2110. Each eyepiece 2108 and 2110 can include transmissive elements through which a real environment can be visible, as well as display elements for presenting a display (e.g., via imagewise modulated light) overlapping the real environment. In some examples, such display elements can include surface diffractive optical elements for controlling the flow of imagewise modulated light. For instance, the left eyepiece 2108 can include a left incoupling grating set 2112, a left orthogonal pupil expansion (OPE) grating set 2120, and a left exit (output) pupil expansion (EPE) grating set 2122. Similarly, the right eyepiece 2110 can include a right incoupling grating set 2118, a right OPE grating set 2114 and a right EPE grating set 2116. Imagewise modulated light can be transferred to a user's eye via the incoupling gratings 2112 and 2118, OPEs 2114 and 2120, and EPE 2116 and 2122. Each incoupling grating set 2112, 2118 can be configured to deflect light toward its corresponding OPE grating set 2120, 2114. Each OPE grating set 2120, 2114 can be designed to incrementally deflect light down toward its associated EPE 2122, 2116, thereby horizontally extending an exit pupil being formed. Each EPE 2122, 2116 can be configured to incrementally redirect at least a portion of light received from its corresponding OPE grating set 2120, 2114 outward to a user eyebox position (not shown) defined behind the eyepieces 2108, 2110, vertically extending the exit pupil that is formed at the eyebox. Alternatively, in lieu of the incoupling grating sets 2112 and 2118, OPE grating sets 2114 and 2120, and EPE grating sets 2116 and 2122, the eyepieces 2108 and 2110 can include other arrangements of gratings and/or refractive and reflective features for controlling the coupling of imagewise modulated light to the user's eyes.

In some examples, wearable head device 2102 can include a left temple arm 2130 and a right temple arm 2132, where the left temple arm 2130 includes a left speaker 2134 and the right temple arm 2132 includes a right speaker 2136. An orthogonal coil electromagnetic receiver 2138 can be located in the left temple piece, or in another suitable location in the wearable head unit 2102. An Inertial Measurement Unit (IMU) 2140 can be located in the right temple arm 2132, or in another suitable location in the wearable head device 2102. The wearable head device 2102 can also include a left depth (e.g., time-of-flight) camera 2142 and a right depth camera 2144. The depth cameras 2142, 2144 can be suitably oriented in different directions so as to together cover a wider field of view.

In the example shown in FIGS. 2A-2D, a left source of imagewise modulated light 2124 can be optically coupled into the left eyepiece 2108 through the left incoupling grating set 2112, and a right source of imagewise modulated light 2126 can be optically coupled into the right eyepiece 2110 through the right incoupling grating set 2118. Sources of imagewise modulated light 2124, 2126 can include, for example, optical fiber scanners; projectors including electronic light modulators such as Digital Light Processing (DLP) chips or Liquid Crystal on Silicon (LCoS) modulators; or emissive displays, such as micro Light Emitting Diode (µLED) or micro Organic Light Emitting Diode (µOLED) panels coupled into the incoupling grating sets 2112, 2118 using one or more lenses per side. The input coupling grating sets 2112, 2118 can deflect light from the sources of imagewise modulated light 2124, 2126 to angles above the critical angle for Total Internal Reflection (TIR) for the eyepieces 2108, 2110. The OPE grating sets 2114, 2120 incrementally deflect light propagating by TIR down toward the EPE grating sets 2116, 2122. The EPE grating sets 2116, 2122 incrementally couple light toward the user's face, including the pupils of the user's eyes.

In some examples, as shown in FIG. 2D, each of the left eyepiece 2108 and the right eyepiece 2110 includes a plurality of waveguides 2402. For example, each eyepiece 2108, 2110 can include multiple individual waveguides, each dedicated to a respective color channel (e.g., red, blue and green). In some examples, each eyepiece 2108, 2110 can include multiple sets of such waveguides, with each set configured to impart different wavefront curvature to emitted light. The wavefront curvature may be convex with respect to the user's eyes, for example to present a virtual object positioned a distance in front of the user (e.g., by a distance corresponding to the reciprocal of wavefront curvature). In some examples, EPE grating sets 2116, 2122 can include curved grating grooves to effect convex wavefront curvature by altering the Poynting vector of exiting light across each EPE.

In some examples, to create a perception that displayed content is three-dimensional, stereoscopically-adjusted left and right eye imagery can be presented to the user through the imagewise light modulators 2124, 2126 and the eyepieces 2108, 2110. The perceived realism of a presentation of a three-dimensional virtual object can be enhanced by selecting waveguides (and thus corresponding the wavefront curvatures) such that the virtual object is displayed at a distance approximating a distance indicated by the stereoscopic left and right images. This technique may also reduce motion sickness experienced by some users, which may be caused by differences between the depth perception cues provided by stereoscopic left and right eye imagery, and the autonomic accommodation (e.g., object distance-dependent focus) of the human eye.

FIG. 2D illustrates an edge-facing view from the top of the right eyepiece 2110 of example wearable head device 2102. As shown in FIG. 2D, the plurality of waveguides 2402 can include a first subset of three waveguides 2404 and a second subset of three waveguides 2406. The two subsets of waveguides 2404, 2406 can be differentiated by different EPE gratings featuring different grating line curvatures to impart different wavefront curvatures to exiting light. Within each of the subsets of waveguides 2404, 2406 each waveguide can be used to couple a different spectral channel (e.g., one of red, green and blue spectral channels) to the user's right eye 2206. (Although not shown in FIG. 2D, the structure of the left eyepiece 2108 is analogous to the structure of the right eyepiece 2110.)

Figure 3A:
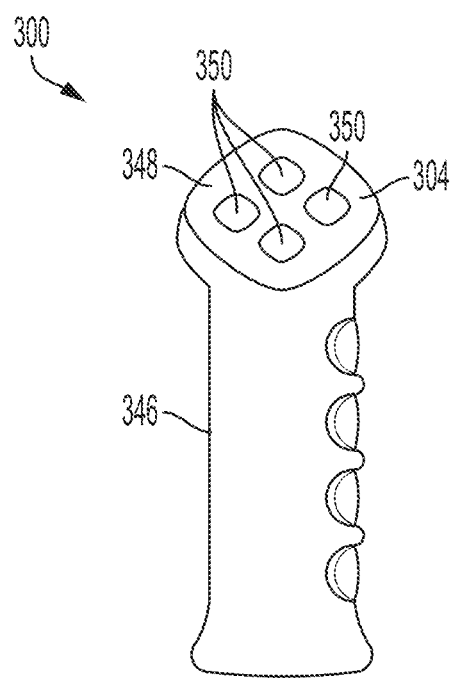
FIG. 3A illustrates an example mixed reality handheld controller that can be used to provide input to a mixed reality environment, according to some embodiments.

FIG. 3A illustrates an example handheld controller component 300 of a mixed reality system 200. In some examples, handheld controller 300 includes a grip portion 346 and one or more buttons 350 disposed along a top surface 348. In some examples, buttons 350 may be configured for use as an optical tracking target, e.g., for tracking six-degree-of-freedom (6DOF) motion of the handheld controller 300, in conjunction with a camera or other optical sensor (which may be mounted in a head unit (e.g., wearable head device 2102) of mixed reality system 200). In some examples, handheld controller 300 includes tracking components (e.g., an IMU or other suitable sensors) for detecting position or orientation, such as position or orientation relative to wearable head device 2102. In some examples, such tracking components may be positioned in a handle of handheld controller 300, and/or may be mechanically coupled to the handheld controller. Handheld controller 300 can be configured to provide one or more output signals corresponding to one or more of a pressed state of the buttons; or a position, orientation, and/or motion of the handheld controller 300 (e.g., via an IMU). Such output signals may be used as input to a processor of mixed reality system 200. Such input may correspond to a position, orientation, and/or movement of the handheld controller (and, by extension, to a position, orientation, and/or movement of a hand of a user holding the controller). Such input may also correspond to a user pressing buttons 350.

Figure 3B:
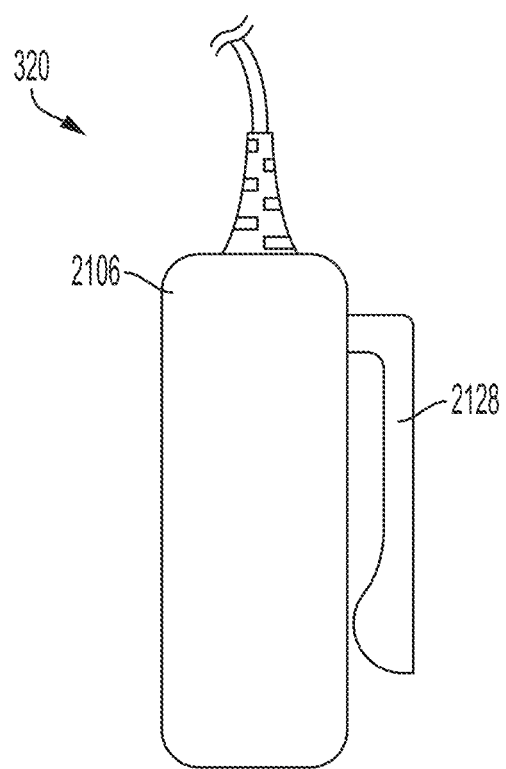
FIG. 3B illustrates an example auxiliary unit that can be used with an example mixed reality system, according to some embodiments.

FIG. 3B illustrates an example auxiliary unit 320 of a mixed reality system 200. The auxiliary unit 320 can include a battery to provide energy to operate the system 200, and can include a processor for executing programs to operate the system 200. As shown, the example auxiliary unit 320 includes a clip 2128, such as for attaching the auxiliary unit 320 to a user's belt. Other form factors are suitable for auxiliary unit 320 and will be apparent, including form factors that do not involve mounting the unit to a user's belt. In some examples, auxiliary unit 320 is coupled to the wearable head device 2102 through a multiconduit cable that can include, for example, electrical wires and fiber optics. Wireless connections between the auxiliary unit 320 and the wearable head device 2102 can also be used.

In some examples, mixed reality system 200 can include one or more microphones to detect sound and provide corresponding signals to the mixed reality system. In some examples, a microphone may be attached to, or integrated with, wearable head device 2102, and may be configured to detect a user's voice. In some examples, a microphone may be attached to, or integrated with, handheld controller 300 and/or auxiliary unit 320. Such a microphone may be configured to detect environmental sounds, ambient noise, voices of a user or a third party, or other sounds.

Figure 4:
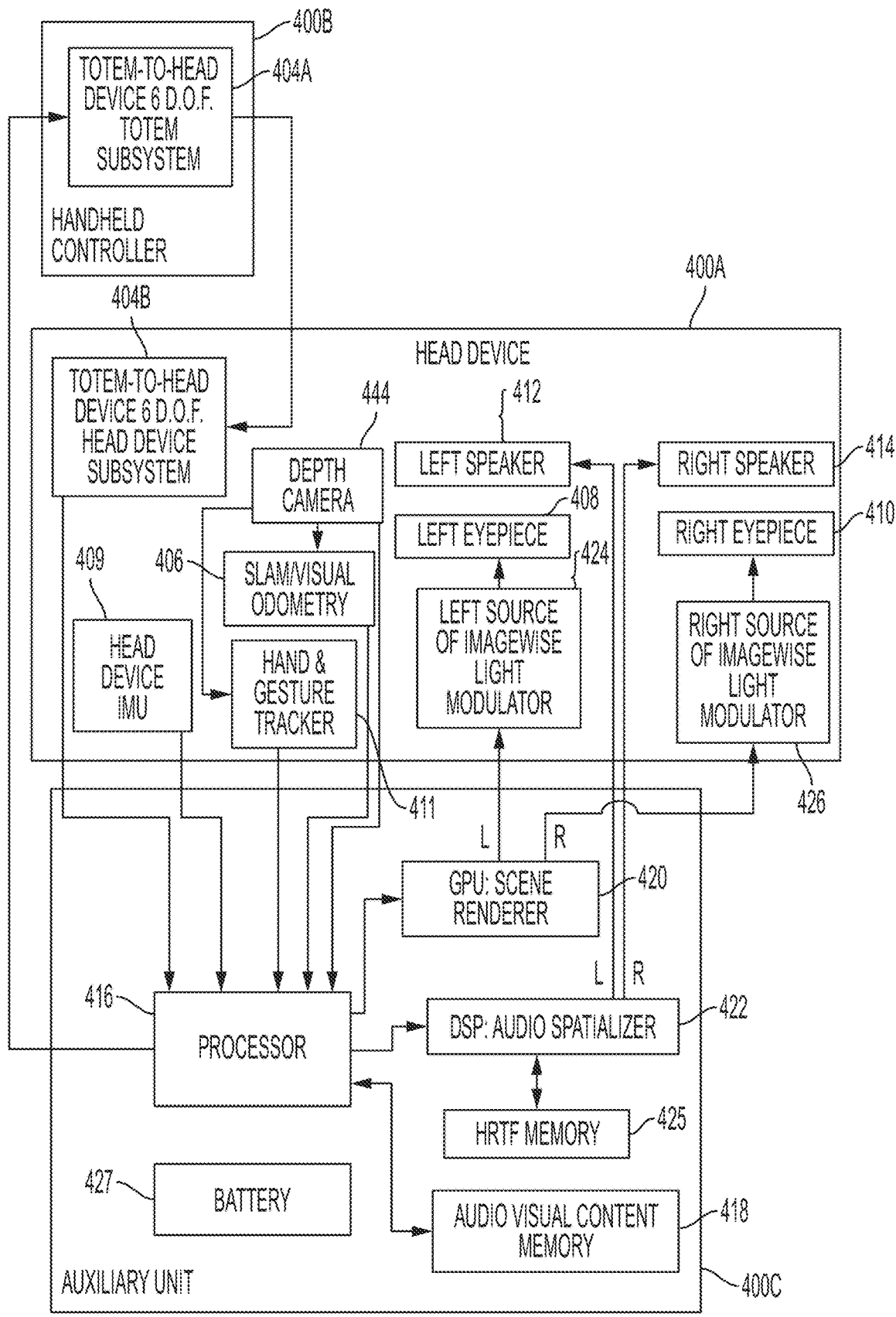
FIG. 4 illustrates an example functional block diagram for an example mixed reality system, according to some embodiments.

FIG. 4 shows an example functional block diagram that may correspond to an example mixed reality system, such as mixed reality system 200 described above (which may correspond to mixed reality system 112 with respect to FIG. 1). As shown in FIG. 4, example handheld controller 400B (which may correspond to handheld controller 300 (a "totem")) includes a totem-to-wearable head device six degree of freedom (6DOF) totem subsystem 404A and example wearable head device 400A (which may correspond to wearable head device 2102) includes a totem-to-wearable head device 6DOF subsystem 404B. In the example, the 6DOF totem subsystem 404A and the 6DOF subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch and roll rotations, as a rotation matrix, as a quaternion, or as some other representation. In some examples, the wearable head device 400A; one or more depth cameras 444 (and/or one or more non-depth cameras) included in the wearable head device 400A; and/or one or more optical targets (e.g., buttons 350 of handheld controller 400B as described above, or dedicated optical targets included in the handheld controller 400B) can be used for 6DOF tracking. In some examples, the handheld controller 400B can include a camera, as described above; and the wearable head device 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the wearable head device 400A relative to the handheld controller 400B may be determined. Additionally, 6DOF totem subsystem 404A can include an Inertial Measurement Unit (IMU) that is useful to provide improved accuracy and/or more timely information on rapid movements of the handheld controller 400B.

In some examples, it may become necessary to transform coordinates from a local coordinate space (e.g., a coordinate space fixed relative to the wearable head device 400A) to an inertial coordinate space (e.g., a coordinate space fixed relative to the real environment), for example in order to compensate for the movement of the wearable head device 400A relative to the coordinate system 108. For instance, such transformations may be necessary for a display of the wearable head device 400A to present a virtual object at an expected position and orientation relative to the real environment (e.g., a virtual person sitting in a real chair, facing forward, regardless of the wearable head device's position and orientation), rather than at a fixed position and orientation on the display (e.g., at the same position in the right lower corner of the display), to preserve the illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 using a SLAM and/or visual odometry procedure in order to determine the transformation of the wearable head device 400A relative to the coordinate system 108. In the example shown in FIG. 4, the depth cameras 444 are coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and another coordinate space (e.g., an inertial coordinate space). Similarly, in some examples, an additional source of information on the user's head pose and location is obtained from an IMU 409. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of the wearable head device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from the wearable head device's 6DOF headgear subsystem 404B, the IMU 409, the SLAM/visual odometry block 406, depth cameras 444, and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426, for example as described above with respect to FIGS. 2A-2D. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 320). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 320 described above). The auxiliary unit 400C may include a battery 427 to power its components and/or to supply power to the wearable head device 400A or handheld controller 400B. Including such components in an auxiliary unit, which can be mounted to a user's waist, can limit the size and weight of the wearable head device 400A, which can in turn reduce fatigue of a user's head and neck.

While FIG. 4 presents elements corresponding to various components of an example mixed reality system, various other suitable arrangements of these components will become apparent to those skilled in the art. For example, elements presented in FIG. 4 as being associated with auxiliary unit 400C could instead be associated with the wearable head device 400A or handheld controller 400B. Furthermore, some mixed reality systems may forgo entirely a handheld controller 400B or auxiliary unit 400C. Such changes and modifications are to be understood as being included within the scope of the disclosed examples.

Dynamic Colocation of Virtual Content

As MR systems proliferate and achieve more market penetration, demands for MR system capabilities may also increase. While an isolated user of an MR system may expect an MR system to display persistent virtual content (e.g., virtual content that can persist in a location relative to the environment, rather than virtual content that can only persist in a location relative to a display), multiple users of MR systems interacting with each other may have more demanding expectations. For example, multiple users of MR systems that inhabit the same real world space may expect to experience the same mixed reality environment. Because users may be inhabiting the same real world environment, users may also expect to inhabit the same virtual environment (both of which may combine to form a mixed reality environment). Specifically, a first user may view a virtual object in the first user's mixed reality environment, and the first user may expect that a second user in the same real environment also be able to see the virtual object in the same location. It can therefore be desirable to colocate virtual content across multiple MR systems.

Virtual object colocation can include placing a virtual object in a mixed reality environment such that it appears in a consistent position relative to the mixed reality environment across more than one MR and/or XR (e.g. a smart phone that can display the shared virtual content on its screen in the correct real world location) system. For example, a virtual coffee mug may be displayed as being placed on a real table. Virtual object persistence may enable a single MR system to move around the mixed reality environment and continually display the virtual coffee mug as resting at the same spot on the real table. Virtual object colocation may enable two or more MR systems to move around the mixed reality environment while both continually display the virtual coffee mug as resting at the same spot on the real table. In other words, a goal of virtual object colocation can be to treat virtual objects like real objects (e.g., objects that can be observed by multiple people simultaneously in a manner that is consistent across each person and their positions respective to the object).

Figure 5:
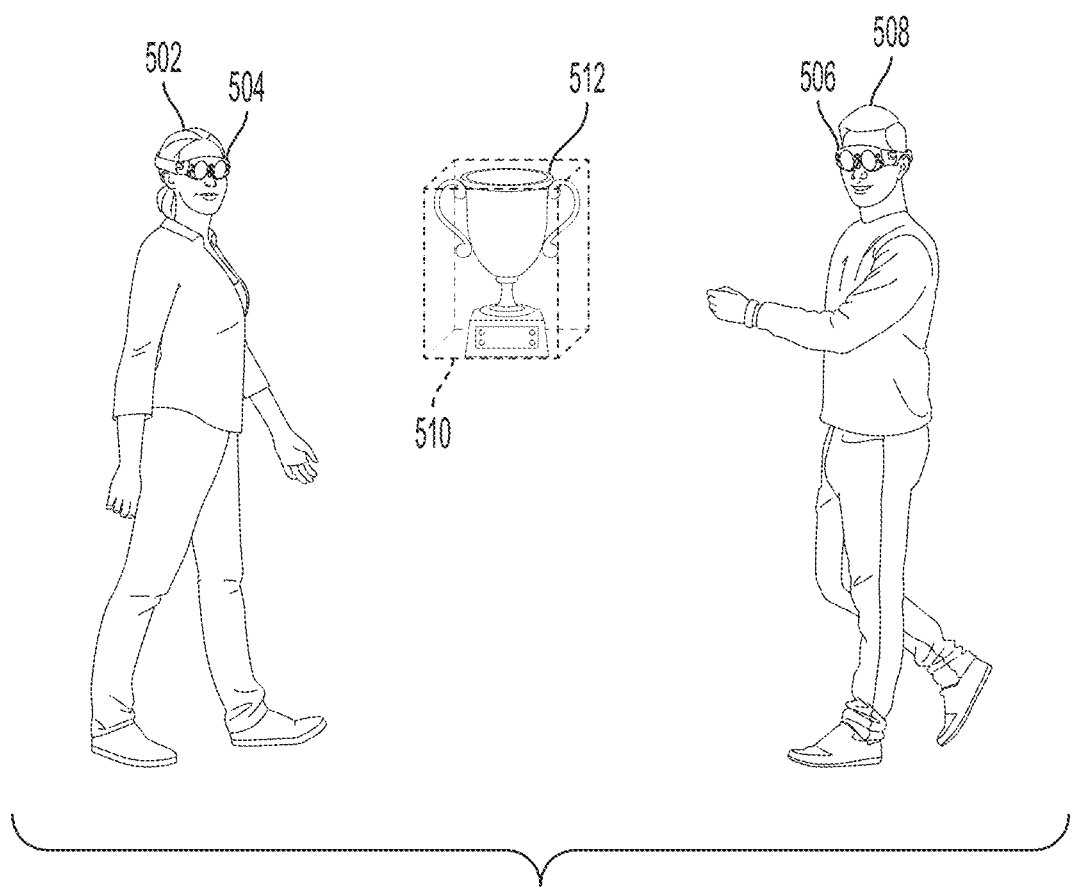
FIG. 5 illustrates an example of virtual object colocation, according to some embodiments.

FIG. 5 illustrates an example of virtual object colocation, according to some embodiments. User 502 and user 508 may inhabit the same real world environment (e.g., user 502 and user 508 may be in close proximity to each other and/or in the same room as each other). In some embodiments, user 502 and/or user 508 may wish to share virtual content with the other user. In some embodiments, a virtual object (e.g., prism 510 and/or geometric object 512) may be colocated for users 502 and user 508. In some embodiments, prism 510 can include a bounding volume, which may include a closed volume around one or more geometric objects. For example, a bounding volume may be a rectangular box sized to the maximum length, width, and/or height of a bounded geometric object or a group of bounded geometric objects. In some embodiments, a bounding volume can be any geometric shape, including a cylinder, sphere, etc. In some embodiments, a prism may include a container for a bounding volume, and a prism may include properties of the bounding volume. For example, a prism may include parameters for whether a bounding volume should intersect with other bounding volumes, whether a bounding volume should be oriented horizontally or vertically, whether and/or how a bounding volume should attach to other virtual objects, etc. In some embodiments, a geometric object can be a mesh of interconnected vertices that may form a three-dimensional object.

In some embodiments, the virtual object may appear in the same position relative to a real world environment and/or a mixed reality environment to both user 502 and user 508. For example, user 502 may perceive prism 510 as resting on a table, and user 508 may also perceive prism 510 as resting on the same table in the same position. As user 502 and/or user 508 move around prism 510, prism 510 may appear to remain stationary (e.g., prism 510 may appear to remain on the same table in the same position) to user 502 and/or user 508. In some embodiments, virtual object colocation can apply to moving objects. For example, user 502 may move prism 510 from a table to a cabinet. User 502 may accomplish this using, for example, a user interface of MR system 504 (which may correspond to MR systems 112, 200). A user interface of MR system 504 may include a hand-held controller that the user may point at prism 510 while pressing a button on the hand-held controller to select prism 510 and move it to a different location. In some embodiments, virtual object colocation can enable user 508 to perceive the movement of prism 510 as user 502 moves prism 510 in user 502's own MRE.

Figure 6:
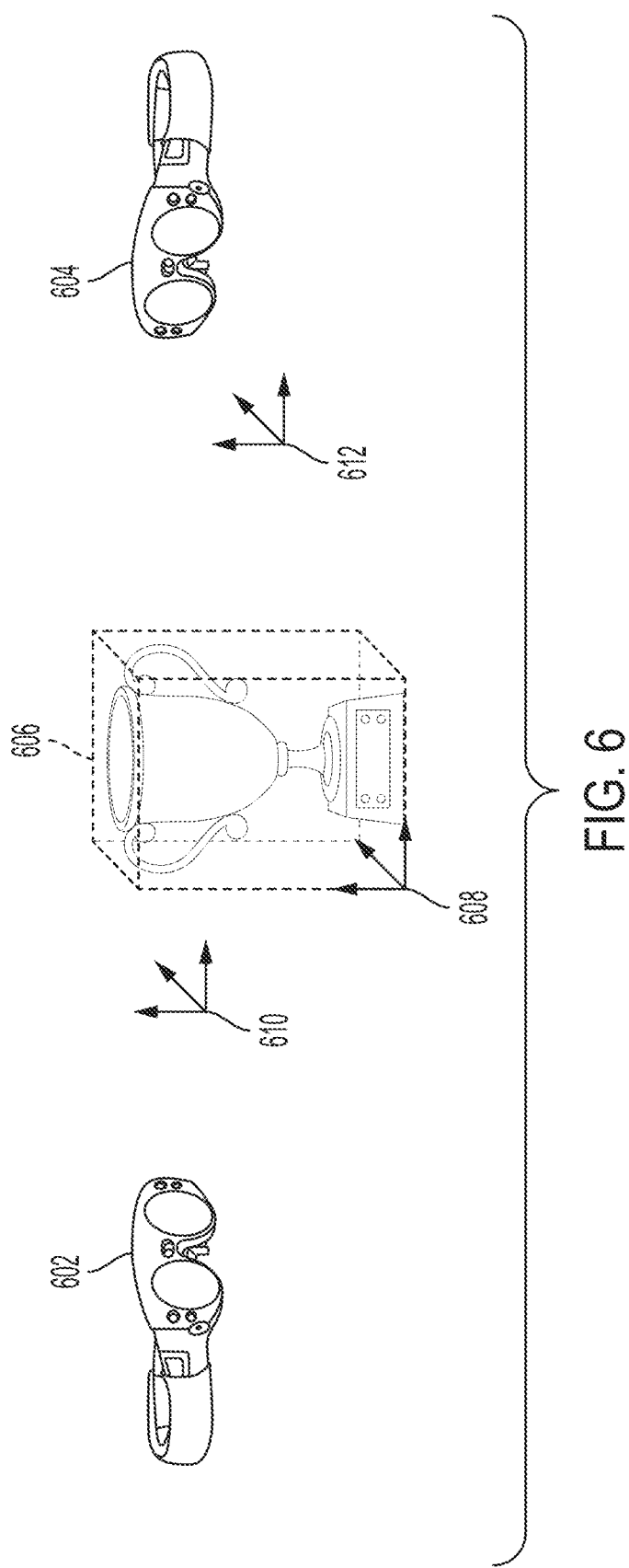
FIG. 6 illustrates an example of virtual object colocation, according to some embodiments.

FIG. 6 illustrates an example of virtual object colocation, according to some embodiments. Virtual object colocation can include communication between one or more MR systems. In some embodiments, MR system 602 (which can correspond to MR systems 112, 200) and MR system 604 (which can correspond to MR systems 112, 200) may communicate to synchronize displays of colocated virtual objects. In some embodiments, MR system 602 and MR system 604 may be independent (e.g., each system may track a user's position and display virtual content in an MRE on its own), and it may be beneficial to allow MR system 602 and MR system 604 to communicate to synchronously colocate virtual content.

In some embodiments, an MR system may utilize one or more persistent coordinate systems (e.g., persistent coordinate system 133) to display persistent virtual content (e.g., virtual content that may remain stationary relative to an MRE, as opposed to stationary relative to a display). In some embodiments, an MR system may utilize visual data (e.g., camera data), inertial data (e.g., IMU data), depth data (e.g., time-of-flight data and/or LIDAR data), and/or other data to establish one or more anchor points (e.g., origin points of a persistent coordinate system) in three-dimensional space. For example, an MR system may utilize visual-inertial odometry and/or simultaneous localization and mapping to create and/or place persistent coordinate systems as the MR system moves around a real environment. In some embodiments, previously established persistent coordinate systems may be saved (e.g., locally to an MR system and/or uploaded to a remote server).

In some embodiments, an MR system may determine (e.g., via location data, via image recognition, and/or via simultaneous localization and mapping) that it is in an environment that has been previously mapped with persistent coordinate systems. The MR system may retrieve previously mapped persistent coordinate systems for use in displaying persistent virtual content. In some embodiments, one or more locally created persistent coordinate systems may be uploaded to a remote server. In some embodiments, a remote server may determine if one or more locally created persistent coordinate systems correspond to one or more previously uploaded persistent coordinate systems. In some embodiments, a remote server may determine a canonical persistent coordinate system from one or more corresponding persistent coordinate systems. For example, a remote server may receive two corresponding persistent coordinate systems from two different MR systems, and the remote server may average the corresponding persistent coordinate systems. In some embodiments, an average may be a weighted average according to one or more confidence measurements (e.g., one MR system may have repeatedly observed a persistent coordinate system, which may increase a confidence in the persistent coordinate system developed by that MR system). In some embodiments, an MR system may retrieve (e.g., locally and/or from a remote server) all corresponding persistent coordinate systems if it is determined that the MR system is in a previously mapped environment. For example, if it is determined that the MR system is in a room that has previously created persistent coordinate systems, the MR system may retrieve all previously created persistent coordinate systems for the room.

In some embodiments, persistent virtual content can be placed in an MRE using one or more persistent coordinate systems. For example, virtual content can be displayed relative to a persistent coordinate system. In some embodiments, one or more transforms between coordinate systems may be used to display persistent virtual content. For example, one or more transforms may be used to translate from a persistent coordinate system to a head coordinate system. In some embodiments, one or more transforms may be used to translate from a head coordinate system to a left eye coordinate system (which may correspond to a left display of a stereoscopic MR system). In some embodiments, one or more transforms may be used to translate from a head coordinate system to a right eye coordinate system (which may correspond to a right display of a stereoscopic MR system). In some embodiments, virtual content can be displayed relative to one or more persistent coordinate systems. For example, virtual content may move in an MRE, and the virtual content may be displayed relative to a persistent coordinate system that is closest to the virtual content at a given time.

In the embodiment depicted in FIG. 6, MR systems 602 and 604 may be located with an MRE that includes persistent coordinate system 610 and persistent coordinate system 612. In some embodiments, MR system 602 may recognize that it is located in a previously mapped environment and retrieve persistent coordinate system 610 and persistent coordinate system 612. In some embodiments, MR system 602 may display prism 606 using coordinate system 608. In some embodiments, coordinate system 608 may include and/or be defined by a transform from persistent coordinate system 610 which may relate a position of prism 606 with persistent coordinate system 610.

In some embodiments, MR system 604 may join MR system 602 in a colocation session, which may allow MR systems 602 and 604 to colocate virtual objects (e.g., prism 606, and/or the virtual content contained within the prism) in real-time. In some embodiments, MR system 602 may send a request to MR system 604 to join a colocation session. In some embodiments, MR system 604 may send a request to MR system 602 to join a colocation session. In some embodiments, MR system 602 and MR system 604 may each run a separate instance of an application that may govern prism 606. In some embodiments, MR system 602 may transmit data to MR system 604 regarding one or more virtual objects to be colocated. For example, MR system 602 may transmit a virtual object identifier that may allow MR system 604 to locate an appropriate virtual object (e.g., from within an application, which may be a different instance of the same application running on MR system 602) and display the virtual object.

Displaying a colocated virtual object can be more accurate if the colocated virtual object is displayed relative to a single persistent coordinate system across MR systems in a colocation session. For example, utilizing a common persistent coordinate system may reduce inaccuracies in object position and/or orientation that may result from errors in different persistent coordinate systems. In some embodiments, MR system 602 and MR system 604 may recognize (individually and/or via communication between each other) that they reside in a space that has been previously mapped with persistent coordinate systems. MR systems 602 and 604 may retrieve persistent coordinate systems corresponding to the recognized real-world environment. In some embodiments, each MR system may send persistent coordinate systems (e.g., nearby persistent coordinate systems and/or persistent coordinate systems corresponding to an occupied environment) to other MR systems in the colocation session. In some embodiments, each MR system may send one or more transforms from one or more persistent coordinate systems to a location of a colocated virtual object.

In some embodiments, an MR system (e.g., MR system 602) may receive persistent coordinate systems and/or a list of persistent coordinate system unique identifiers used by other MR systems in the colocation session (e.g., MR system 604). In some embodiments, an MR system (e.g., MR system 602 and/or MR system 604) may compare the persistent coordinate systems in use by other MR systems in the colocation session with the persistent coordinate systems in use by the MR system itself. In some embodiments, the MR system may determine that persistent coordinate system 610 is in use by and/or common to all MR systems in the colocation session. In some embodiments, the MR system may receive one or more transforms from one or more persistent coordinate systems to a location of a colocated virtual object. In some embodiments, the MR system may display the colocated virtual content (e.g., prism 606, and/or the virtual content associated with prism 606) using persistent coordinate system 610 (e.g., by using a transform relative to persistent coordinate system 610). In some embodiments, persistent coordinate systems used for colocation comparison may be canonical persistent coordinate systems (e.g., persistent coordinate systems retrieved from a remote server that may have unified multiple observations of a persistent coordinate system).

In some embodiments, more than one persistent coordinate system may be common to all MR systems in a colocation session. In some embodiments, each MR system may display colocated virtual content using a common persistent coordinate system that is closest to a location of the colocated virtual content. In some embodiments, MR systems may negotiate with other MR systems in a colocation session to display colocated virtual content relative to a single common persistent coordinate system.

In some embodiments, colocated virtual content can move during a colocation session. For example, MR system 602 may cause prism 606 to move during a colocation session. In some embodiments, an MR system initiating movement (e.g., MR system 602) may continuously transmit (e.g., at a rate of 15 Hz, 30 Hz, 60 Hz, etc.) transform data (e.g., a transformation matrix) to other MR systems in a colocation session. In some embodiments, receiving MR systems (e.g., MR system 604) may already be displaying colocated virtual content using the same persistent coordinate system as the initiating MR system. In some embodiments, the receiving MR systems may use the transform data to display the movement of the colocated virtual content. In some embodiments, receiving MR systems may be displaying colocated virtual content using a different persistent coordinate system than the initiating MR system (e.g., a different common persistent coordinate system). In some embodiments, receiving MR systems may switch to displaying colocated virtual content using the common persistent coordinate system in use by the initiating MR system, which may allow receiving MR systems to directly use transform data transmitted by the initiating MR system. In some embodiments, receiving MR systems may not switch from its persistent coordinate system and may utilize a transform from the persistent coordinate system used by the initiating MR system to the persistent coordinate system used by the receiving MR system.

In some embodiments, more than one MR system can move colocated virtual content simultaneously. For example, MR system 602 may move prism 606. While MR system 602 is moving prism 606, MR system 604 may also move prism 606. In some embodiments, MR system 604 may display prism 606 as moving when MR system 602 is moving prism 606. In some embodiments, once MR system 604 begins moving prism 606, MR system 604 may display its own movements (e.g., overriding movements made by MR system 602). In some embodiments, MR system 602 will locally continue displaying its own movements while MR system 604 is locally displaying MR system 604's movements. In some embodiments, once MR system 602 releases prism 606, MR system 602 will display prism 606 according to movements by MR system 604.

Figure 7:
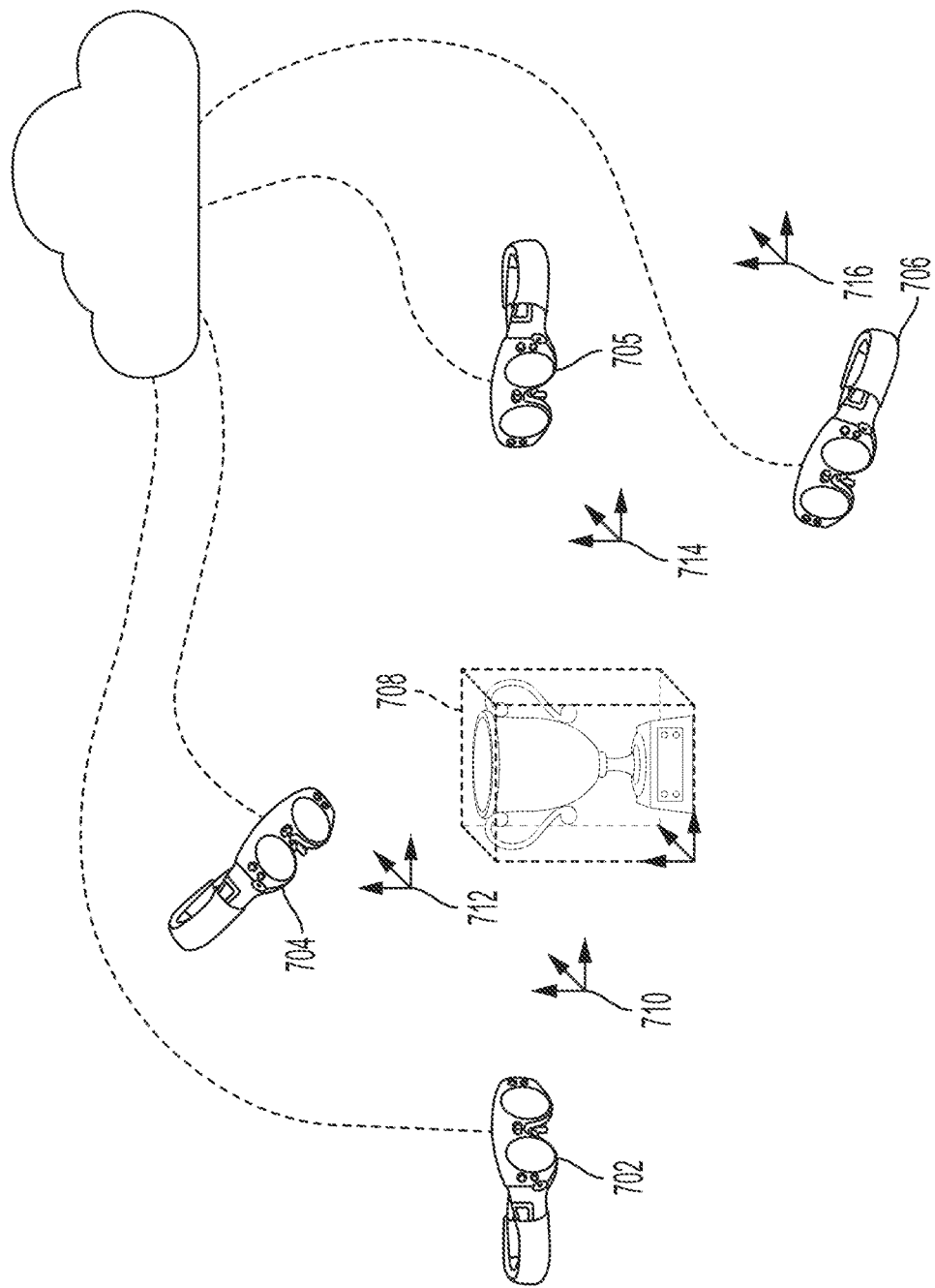
FIG. 7 illustrates an example of virtual object colocation across multiple environments, according to some embodiments.

FIG. 7 illustrates an example of virtual object colocation across multiple environments, according to some embodiments. In some embodiments, MR systems 702 and 704 may occupy a first environment (e.g., a first room), and MR systems 705 and 706 may occupy a second environment (e.g., a second room). In some embodiments, MR systems 702, 704, 705, and 706 may be in the same colocation session and may share persistent coordinate systems (e.g., those in use and/or those nearby) and/or transformation data. Because MR systems 702 and 704 may occupy a different environment than MR systems 705 and 706, MR systems 702 and 704 may not utilize common persistent coordinate systems with MR systems 705 and 706. In some embodiments, MR systems 702 and 704 can determine that they share at least one common persistent coordinate system (e.g., persistent coordinate systems 710 and/or 712) and colocate virtual content with each other (e.g., using persistent coordinate systems 710 and/or 712). In some embodiments, MR systems 705 and 706 can determine that they share at least one persistent coordinate system (e.g., persistent coordinate systems 714 and/or 716) and colocate virtual content with each other (e.g., using persistent coordinate systems 714 and/or 716).

In some embodiments, colocated virtual content within a colocation session can continue to share relative movements even across different persistent coordinate systems. For example, prism 708 may be displayed in relation to persistent coordinate system 710 for MR systems 702 and 704 while being displayed in relation to persistent coordinate system 714 for MR systems 705 and 706. Prism 708 may be displayed as moving for all MR systems in a colocation session (e.g., MR systems 702, 704, 705, and 706), even though different MR systems may anchor prism 708 to different persistent coordinate systems.

In some embodiments, colocated virtual content may not move for remote users if the colocated virtual content is moved locally. For example, MR systems 702 and 704 may be local to each other (e.g., because they share one or more persistent coordinate systems). In some embodiments MR systems 705 and/or 706 may be considered remote to MR system 702 and/or 704 (e.g., because MR systems 705 and/or 706 may not share persistent coordinate systems with MR systems 702 and/or 704). In some embodiments, MR systems 705 and/or 706 therefore may not see prism 708 move if MR system 702 moves prism 708.

In some embodiments, an MR system joining an existing colocation session may colocate with another MR system already in the session. For example, MR systems 702, 704, and 705 may already be in a colocation session. In some embodiments, MR system 706 may join the colocation session (e.g., because MR system 706 entered the same room as MR system 705). In some embodiments, MR system 706 may display prism 708 at the same location as MR system 705 (e.g., using persistent coordinate system 714 used by MR system 705). It can be desirable to maintain positional continuity for existing session members when a new member joins a session (e.g., so existing session members are not disrupted by shifting virtual content to match a newly joined member).

In some embodiments, virtual content may be colocated according to the first MR system to display the virtual content. For example, MR systems 702 and 704 may not be in a colocation session, but may be each displaying prism 708 separately. In some embodiments, if MR systems 702 and 704 begin a colocation session, prism 708 may be displayed at the location that MR system 702 is displaying the prism (e.g., because MR system 702 began displaying prism 708 before MR system 704). In some embodiments, virtual content may be colocated according to an MR system that initiated a colocation session.

In some embodiments, MR systems initiating and/or participating in a colocation session may communicate with each other via one or more Internet connections. For example, MR systems in a colocation session may communicate with a remote server which may route connections to other MR systems in the colocation session. In some embodiments, MR systems may communicate with each other using peer-to-peer connections. In some embodiments, MR systems may communicate with each other using ad hoc networks. For example, MR systems in a colocation session may communicate with each other directly using WiFi, Bluetooth, infrared, etc.

Figure 8:
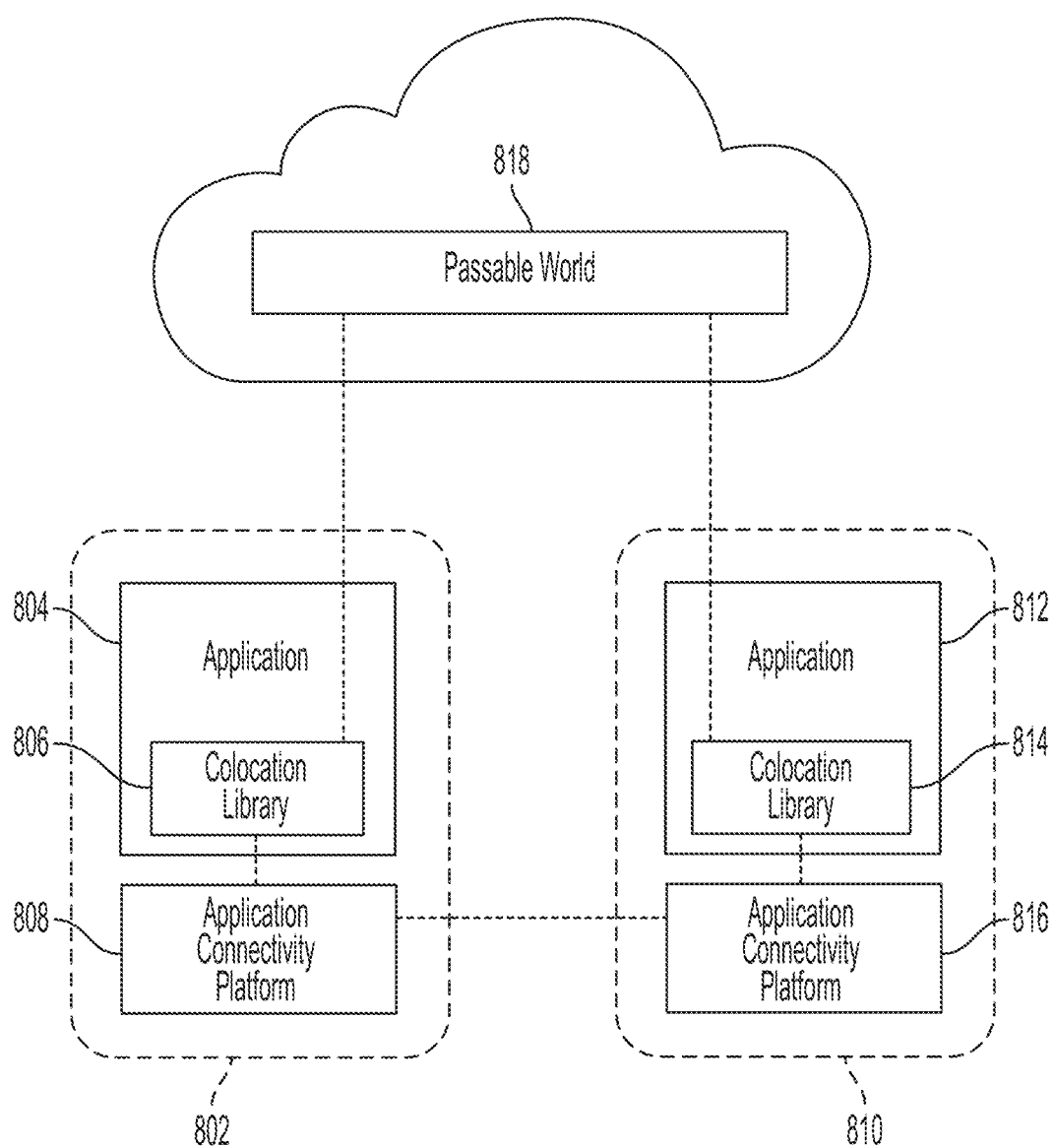
FIG. 8 illustrates an example network architecture for virtual object colocation, according to some embodiments.

FIG. 8 illustrates an example network architecture for virtual object colocation, according to some embodiments. MR system 802 may run and/or host application 804. In some embodiments, application 804 may include colocation library 806. In some embodiments, colocation library 806 can be configured to receive persistent coordinate data (e.g., a unique identifier for a particular persistent coordinate system) from a remote server and/or from MR systems in a colocation session. In some embodiments, colocation library 806 can be configured to broadcast persistent coordinate data (e.g., persistent coordinate systems in use by host MR system 802) to other MR systems in a colocation session. In some embodiments, colocation library 806 can compare persistent coordinate data received from other MR systems in a colocation session with persistent coordinate data in use by a host MR system to determine if common persistent coordinate systems exist. In some embodiments, colocation library 806 can be a client of passable world service 818, which may run in a remote server. In some embodiments, passable world service 818 may store canonical persistent coordinate systems and/or receive observed persistent coordinate systems and unify observations with corresponding canonical persistent coordinate systems. In some embodiments, colocation library 806 may receive canonical persistent coordinate systems in use by host MR system 802 from passable world service 818. In some embodiments, passable world service 818 can run locally as a background service on a host MR system.

Colocation library 806 can be configured to execute a process, which may run in a run-time environment. In some embodiments, colocation library 806 can be configured to execute a sub-process of a parent process. In some embodiments, colocation library 806 can be configured to execute a thread of a parent process. In some embodiments, colocation library 806 can be configured to operate a service (e.g., as a background operating system service). In some embodiments, a process, sub-process, thread, and/or service executed by colocation library 806 can be configured to continually run (e.g., in the background) while an operating system of a host system is running. In some embodiments, a service executed by colocation library 806 can be an instantiation of a parent background service, which may serve as a host process to one or more background processes and/or sub-processes. In some embodiments, colocation library 806 may be distributed among and/or execute on a plurality of systems. In some embodiments, each component of colocation library 806 may execute in parallel, sequentially, or in any combination of the two or more systems of the plurality of systems.

In some embodiments, colocation library 806 can receive persistent coordinate data from other MR systems via application connectivity platform 808 (e.g., colocation library 806 can be a client of application connectivity platform 808). In some embodiments, application connectivity platform 808 can provide a low-latency communication pathway between MR systems in a colocation session to enable real-time virtual object colocation. In some embodiments, application connectivity platform 808 can include one or more implementations of Web Real-Time Communication ("WebRTC"). For example, data may be transmitted via one or more Twilio tracks for low-latency communication.

Application connectivity platform 808 can be configured to execute a process, which may run in a run-time environment. In some embodiments, application connectivity platform 808 can be configured to execute a sub-process of a parent process. In some embodiments, application connectivity platform 808 can be configured to execute a thread of a parent process. In some embodiments, application connectivity platform 808 can be configured to operate a service (e.g., as a background operating system service). In some embodiments, a process, sub-process, thread, and/or service executed by application connectivity platform 808 can be configured to continually run (e.g., in the background) while an operating system of a host system is running. In some embodiments, a service executed by application connectivity platform 808 can be an instantiation of a parent background service, which may serve as a host process to one or more background processes and/or sub-processes. In some embodiments, application connectivity platform 808 may be distributed among and/or execute on a plurality of systems. In some embodiments, each component of application connectivity platform 808 may execute in parallel, sequentially, or in any combination of the two or more systems of the plurality of systems.

In some embodiments, host MR system 810 may be in a colocation session with host MR system 802. In some embodiments, host MR system 802 may run application 812, which may be a separate but identical instantiation of application 804. In some embodiments, application 812 may include colocation library 814, which may be configured to receive persistent coordinate data from a remote server and/or from other MR systems in a colocation session. In some embodiments, colocation library 814 can be configured to broadcast persistent coordinate data (e.g., persistent coordinate systems in use by host MR system 810) to other MR systems in a colocation session. In some embodiments, colocation library 814 may utilize application connectivity platform 816 to send and/or receive low-latency colocation data (e.g., relational transform data as a colocated virtual object moves) from MR systems in a colocation session. In some embodiments, application connectivity platform 816 can be configured to communicate with other application connectivity platforms running on other MR systems (e.g., application connectivity platform 808).

Figure 9:
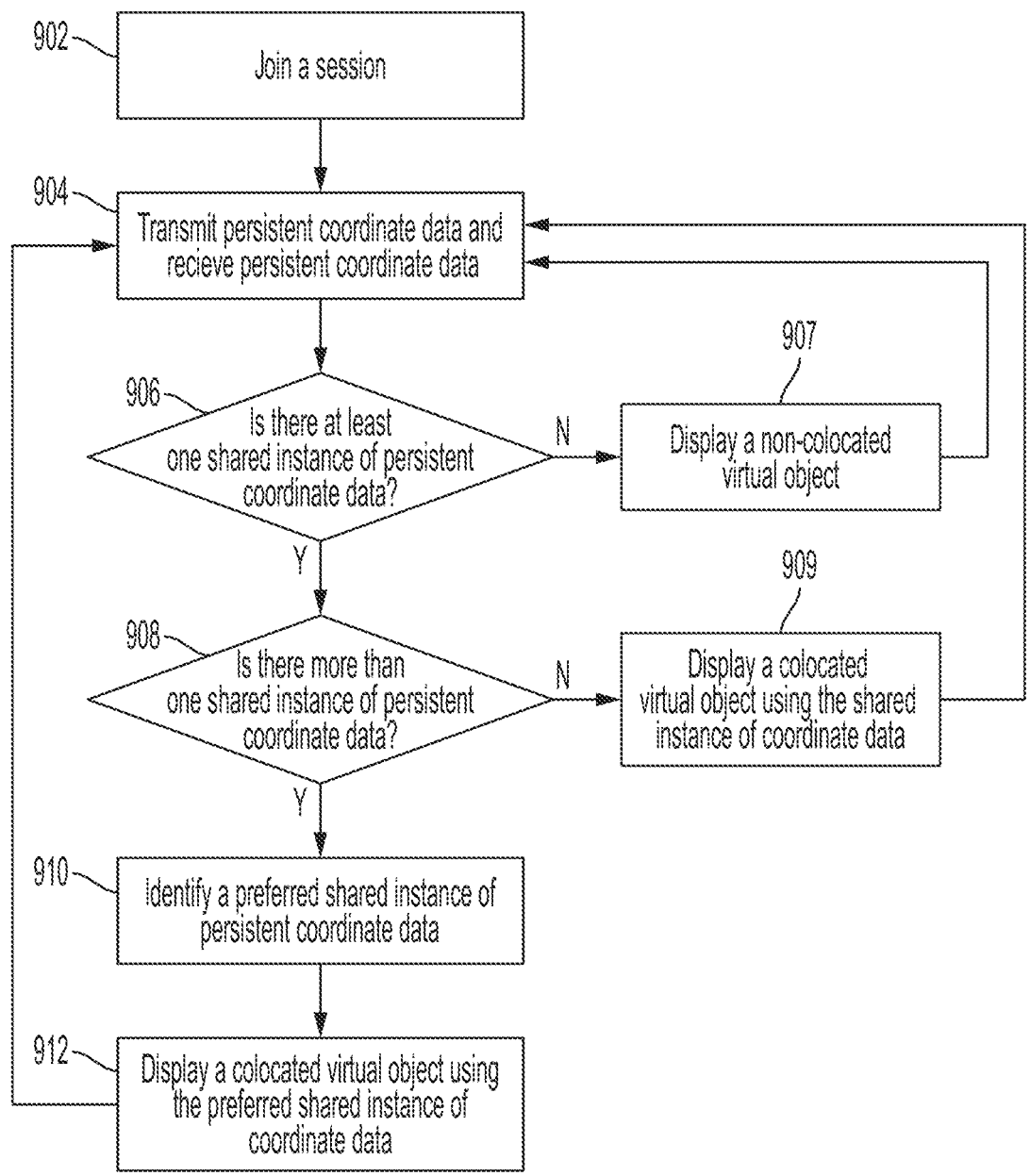
FIG. 9 illustrates an example process for colocating virtual content, according to some embodiments.

FIG. 9 illustrates an exemplary process for colocating virtual content. At step 902, an MR system may join a colocation session. In some embodiments, an MR system may be invited to join an existing colocation session. In some embodiments, an MR system may initiate a colocation session.

At step 904, an MR system may transmit persistent coordinate data and receive persistent coordinate data. In some embodiments, an MR system may transmit persistent coordinate data (and/or relational data) to other MR systems in a colocation session. In some embodiments, an MR system may transmit persistent coordinate data (and/or relational data) to one or more remote servers, which may transmit the data to other MR systems in a colocation session. In some embodiments, an MR system may receive persistent coordinate data (and/or relational data) from one or more MR systems in a colocation session. In some embodiments, an MR system may receive persistent coordinate data (and/or relational data) corresponding to one or more MR systems from one or more remote servers.

At step 906, an MR system may determine if at least one shared instance of persistent coordinate data exists. For example, a first MR system may compare persistent coordinate data received from other MR systems against persistent coordinate data corresponding to the first MR system (which may have been transmitted at step 904). In some embodiments, each instance of persistent coordinate data may include a unique identifier, and unique identifiers may be compared. In some embodiments, any MR systems that recognize their location as a previously mapped room may receive persistent coordinate data corresponding to that room. In some embodiments, any MR systems in the same room may share at least one instance of persistent coordinate data.

If no shared instances of persistent coordinate data exist between the received persistent coordinate data and the transmitted persistent coordinate data (e.g., because an MR system is not in the same room as other MR systems), at step 907 a non-colocated virtual object may be displayed. In some embodiments, a non-colocated virtual object may be an object whose movement may not be reflected for other MR systems in a colocation session.

If at least one shared instance of persistent coordinate data is identified, at step 908 it can be determined if more than one shared instances of persistent coordinate data can be identified. For example, a first MR system may be located in the same room as a second MR system, and the room may include two or more instances of persistent coordinate data. In some embodiments, the first and second MR systems may therefore have two or more instances of shared persistent coordinate data.

If it is determined that only one shared instance of persistent coordinate data exists, at step 909 a colocated virtual object may be displayed using the shared instance of persistent coordinate data. For example, a first and second colocated MR system may both display the colocated virtual object relative to the shared instance of persistent coordinate data. In some embodiments, the first and second colocated MR systems may use the same relational data (e.g., a transformation matrix) to relate a position (e.g., a location and/or an orientation) of the virtual object to the shared instance of persistent coordinate data.

If it is determined that more than one shared instance of persistent coordinate data exists, at step 910 a preferred shared instance of persistent coordinate data can be identified. In some embodiments, an instance of persistent coordinate data closest to an MR system may be considered a preferred instance of shared persistent coordinate data. For example, a first and second colocated MR system may be located in the same room. In some embodiments, the room may include a first and second instance of persistent coordinate data, and both instances may be shared across the first and second MR systems (e.g., because they are in the same room). In some embodiments, the first MR system may be closer to the first instance of persistent coordinate data, and the second MR system may be closer to the second instance of persistent coordinate data. In some embodiments, a closer instance of persistent coordinate data may display virtual content more accurately than a farther instance of persistent coordinate data.

At step 912, colocated virtual content may be displayed using a preferred instance of shared persistent coordinate data. In some embodiments, each MR system may display colocated virtual content relative to its preferred (e.g., closest) instance of shared persistent coordinate data. In some embodiments, although different instances of shared persistent coordinate data may be used, the colocated virtual content may appear in the same spot to users of the first and second MR systems (e.g., because different relational data may be used to present the object in the same location).

After step 907, 909, and/or 912, an MR system may return to step 904, which may enable dynamic colocation. For example, an MR system may continually monitor whether it shares persistent coordinate data with other MR systems in a colocation session. In some embodiments, an MR system may poll persistent coordinate data once every ten seconds if the MR system does not recognize its current location. In some embodiments, an MR system may poll persistent coordinate data once every thirty seconds if the MR system recognizes its current location. In some embodiments, a trigger (e.g., a geofencing trigger) may cause an MR system to poll persistent coordinate data.

Figure 10:
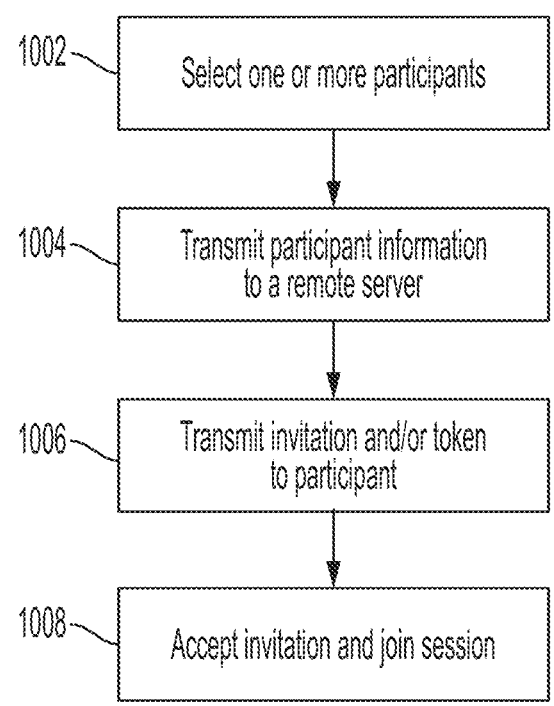
FIG. 10 illustrates an example process for connecting with one or more MR systems to initiate a colocation session, according to some embodiments.

FIG. 10 illustrates an exemplary process for connecting with one or more MR systems to initiate a colocation session, according to some embodiments. In some embodiments, a process for connecting with one or more MR systems may utilize application connectivity platform (e.g., application connectivity platform 808). At step 1002, one or more colocation session participants may be selected. In some embodiments, one or more participants may be selected using a user interface of an application (e.g., application 804).

At step 1004, participant information may be transmitted to a remote server. In some embodiments, an application (e.g., application 804) may transmit participant information to an application connectivity platform (e.g., application connectivity platform 808). In some embodiments, the application connectivity platform may transmit participant information to a remote server. In some embodiments, a remote server may begin a session.

At step 1006, a remote server may transmit an invitation and/or a token (e.g., an authentication token) to one or more participants based on the participant information. In some embodiments, a remote server may transmit an invitation and/or a token to an application connectivity platform running on an invited MR system (e.g., application connectivity platform 816). In some embodiments, the application connectivity platform may communicate with an application (e.g., application 812). In some embodiments, an application running on an invited MR system may indicate to a user that the user has been invited to a colocation session.

At step 1006, an invitation to join a colocation session may be accepted, and a user and/or an MR system may join the colocation session. In some embodiments, a user may accept an invitation using a user interface (e.g., of application 812). In some embodiments, the application may indicate to an application connectivity platform (e.g., application connectivity platform 816) that the invitation has been accepted. In some embodiments, the application connectivity platform may join the colocation session (e.g., by using a provided authentication token). In some embodiments, once one or more participants have joined a session, one or more pipes (e.g., Twilio tracks) may be created. In some embodiments, a pipe may be permissioned. For example, only designated users may transmit data using a permissioned pipe. In some embodiments, any user may transmit and/or receive data along a pipe. In some embodiments, one or more pipe can be reserved for specific types of data (e.g., a pipe for audio, video, and/or generic data).

Systems and methods for collocating virtual content described herein can provide several advantages. For example, running separate instances of applications and/or positioning of colocated virtual objects can provide a decentralized architecture. With a decentralized architecture, a colocation session may avoid disruption if a master in a centralized architecture leaves the session. In some embodiments, centralized architectures (e.g., where a master MR system instructs slave MR systems to utilize specific coordinate systems and/or transformations) may not smoothly continue a colocation session if the master leaves the session. Recalculations may be performed as a new master takes over a session in a centralized architecture. In some embodiments, a decentralized architecture can enable colocation sessions where one or more MR systems are not located in the same environment (and therefore may not share common persistent coordinate systems). In some embodiments, a decentralized architecture may relieve a master system from the burden of calculating a position for colocated virtual objects in two different persistent coordinate systems.

Example systems, methods, and non-transitory computer-readable media are disclosed. According to some examples, a system comprises: a head-wearable device having a display and one or more sensors; and one or more processors configured to execute a method comprising: receiving first persistent coordinate data, second persistent coordinate data, and relational data; determining, based on input received via the one or more sensors, third persistent coordinate data and fourth persistent coordinate data; determining whether the first persistent coordinate data corresponds to the third persistent coordinate data; in accordance with a determination that the first persistent coordinate data corresponds to the third persistent coordinate data: determining whether the second persistent coordinate data corresponds to the fourth persistent coordinate data; in accordance with a determination that the second persistent coordinate data corresponds to the fourth persistent coordinate data: displaying a virtual object via the display of the head-wearable device using the relational data and the second persistent coordinate data; in accordance with a determination that the second persistent coordinate data does not correspond to the fourth persistent coordinate data: displaying the virtual object via the display of the head-wearable device using the relational data and the first persistent coordinate data; and in accordance with a determination that the first persistent coordinate data does not correspond to the third persistent coordinate data: forgoing displaying the virtual object via the display of the head-wearable device. In some examples, the first persistent coordinate data corresponds to a first location, the second persistent coordinate data corresponds to a second location, and the second location is closer than the first location to a location of the head-wearable device. In some examples, the head-wearable device is a first head-wearable device, and the first persistent coordinate data is received from a second head-wearable device. In some examples, the head-wearable device is a first head-wearable device, and the relational data is received from a second head-wearable device. In some examples, the method further comprises receiving data corresponding to the virtual object. In some examples, the third persistent coordinate data corresponds to a current location of the head-wearable device. In some examples, the relational data comprises a transformation matrix.

According to some examples, a method comprises: receiving first persistent coordinate data, second persistent coordinate data, and relational data; determining, based on input received via one or more sensors of a head-wearable device, third persistent coordinate data and fourth persistent coordinate data; determining whether the first persistent coordinate data corresponds to the third persistent coordinate data; in accordance with a determination that the first persistent coordinate data corresponds to the third persistent coordinate data: determining whether the second persistent coordinate data corresponds to the fourth persistent coordinate data; in accordance with a determination that the second persistent coordinate data corresponds to the fourth persistent coordinate data: displaying a virtual object via a display of the head-wearable device using the relational data and the second persistent coordinate data; in accordance with a determination that the second persistent coordinate data does not correspond to the fourth persistent coordinate data: displaying the virtual object via the display of the head-wearable device using the relational data and the first persistent coordinate data; and in accordance with a determination that the first persistent coordinate data does not correspond to the third persistent coordinate data: forgoing displaying the virtual object via the display of the head-wearable device. In some examples, the first persistent coordinate data corresponds to a first location, the second persistent coordinate data corresponds to a second location, and the second location is closer than the first location to a location of the head-wearable device. In some examples, the head-wearable device is a first head-wearable device, and the first persistent coordinate data is received from a second head-wearable device. In some examples, the head-wearable device is a first head-wearable device, and the relational data is received from a second head-wearable device. In some examples, the method further comprises receiving data corresponding to the virtual object. In some examples, the third persistent coordinate data corresponds to a current location of the head-wearable device. In some examples, the relational data comprises a transformation matrix.

According to some examples, a non-transitory computer-readable medium stores instructions that, when executed by one or more processors, cause the one or more processors to execute a method comprising: receiving first persistent coordinate data, second persistent coordinate data, and relational data; determining, based on input received via one or more sensors of a head-wearable device, third persistent coordinate data and fourth persistent coordinate data; determining whether the first persistent coordinate data corresponds to the third persistent coordinate data; in accordance with a determination that the first persistent coordinate data corresponds to the third persistent coordinate data: determining whether the second persistent coordinate data corresponds to the fourth persistent coordinate data; in accordance with a determination that the second persistent coordinate data corresponds to the fourth persistent coordinate data: displaying a virtual object via a display of the head-wearable device using the relational data and the second persistent coordinate data; in accordance with a determination that the second persistent coordinate data does not correspond to the fourth persistent coordinate data: displaying a virtual object via the display of the head-wearable device using the relational data and the first persistent coordinate data; and in accordance with a determination that the first persistent coordinate data does not correspond to the third persistent coordinate data: forgoing displaying the virtual object via the display of the head-wearable device. In some examples, the first persistent coordinate data corresponds to a first location, the second persistent coordinate data corresponds to a second location, and the second location is closer than the first location to a location of the head-wearable device. In some examples, the head-wearable device is a first head-wearable device, and the first persistent coordinate data is received from a second head-wearable device. In some examples, the head-wearable device is a first head-wearable device, and the relational data is received from a second head-wearable device. In some examples, the method further comprises receiving data corresponding to the virtual object. In some examples, the third persistent coordinate data corresponds to a current location of the head-wearable device. In some examples, the relational data comprises a transformation matrix.

According to some examples, a system comprises: a head-wearable device having a display and one or more sensors; and one or more processors configured to execute a method comprising: receiving first persistent coordinate data; receiving relational data, wherein the relational data relates a position to the first persistent coordinate data; determining, based on input received via the one or more sensors, second persistent coordinate data; determining whether the first persistent coordinate data corresponds to the second persistent coordinate data; in accordance with a determination that the first persistent coordinate data corresponds to the second persistent coordinate data, displaying a virtual object via the display of the head-wearable device based on the first persistent coordinate data and based on the relational data; and in accordance with a determination that the first persistent coordinate data does not correspond to the second persistent coordinate data, forgoing displaying the virtual object via the display of the head-wearable device. In some examples, the head-wearable device is a first head-wearable device, and the method further comprises transmitting the second persistent coordinate data to a second head-wearable device. In some examples, the head-wearable device is a first head-wearable device, and the first persistent coordinate data is received from a second head-wearable device. In some examples, the head-wearable device is a first head-wearable device, and the relational data is received from a second head-wearable device. In some examples, the method further comprises receiving data corresponding to the virtual object. In some examples, the second persistent coordinate data corresponds to a current location of the head-wearable device. In some examples, the relational data comprises a transformation matrix.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

The invention claimed is:

1. A system comprising:
a wearable head device comprising a display and one or more sensors; and
one or more processors configured to perform a method comprising:
receiving first persistent coordinate data, wherein the first persistent coordinate data comprises a transformation matrix relating a virtual coordinate space of a physical environment to a real coordinate space of the physical environment;
receiving relational data, wherein the relational data relates a position to the first persistent coordinate data;
determining, based on input received via the one or more sensors, first location data identifying a first environment of the wearable head device;
determining whether the first persistent coordinate data corresponds to the first environment of the wearable head device;
in accordance with a determination that the first persistent coordinate data corresponds to the first environment of the wearable head device, displaying a virtual object at the position via the display of the wearable head device based on the first persistent coordinate data and based further on the relational data; and
in accordance with a determination that the first persistent coordinate data does not correspond to the first environment of the wearable head device, forgoing displaying the virtual object via the display of the wearable head device,
wherein the first persistent coordinate data is determined based on a combination of two or more sets of second persistent coordinate data.

2. The system of claim 1, wherein the wearable head device is a first wearable head device, and wherein the method further comprises transmitting the first location data to a second wearable head device.

3. The system of claim 1, wherein the wearable head device is a first wearable head device, and wherein said receiving the first persistent coordinate data comprises receiving the first persistent coordinate data from a second wearable head device.

4. The system of claim 1, wherein the wearable head device is a first wearable head device, and wherein said receiving the relational data comprises receiving the relational data from a second wearable head device.

5. The system of claim 1, the method further comprising receiving data corresponding to the virtual object.

6. The system of claim 1, wherein the first environment of the wearable head device corresponds to a room.

7. The system of claim 1, wherein the relational data comprises matrix data.

8. The system of claim 1, wherein the combination of the two or more sets of second persistent coordinate data comprises a weighted average of the two or more sets of second persistent coordinate data.

9. The system of claim 8, wherein the weighted average is determined by applying one or more confidence measurements to the two or more sets of second persistent coordinate data.

10. The system of claim 1, wherein the two or more sets of second persistent coordinate data are determined based on at least one observation of the physical environment by one or more of: the wearable head device and one or more second wearable head devices.

11. The system of claim 1, wherein said receiving the first persistent coordinate data comprises receiving the first persistent coordinate data from a remote server.

12. The system of claim 11, wherein the first persistent coordinate data is determined at the remote server.

13. The system of claim 12, wherein the two or more sets of second persistent coordinate data are transmitted to the remote server by one or more of: the wearable head device and one or more second wearable head devices.

14. A method comprising:
receiving, at a wearable head device, first persistent coordinate data, wherein the first persistent coordinate data comprises a transformation matrix relating a virtual coordinate space of a physical environment to a real coordinate space of the physical environment;
receiving, at the wearable head device, relational data, wherein the relational data relates a position to the first persistent coordinate data;

determining, based on input received via one or more sensors of the wearable head device, first location data identifying a first environment of the wearable head device;

determining whether the first persistent coordinate data corresponds to the first environment of the wearable head device;

in accordance with a determination that the first persistent coordinate data corresponds to the first environment of the wearable head device, displaying a virtual object at the position via a display of the wearable head device based on the first persistent coordinate data and based further on the relational data; and in accordance with a determination that the first persistent coordinate data does not correspond to the first environment of the wearable head device, forgoing displaying the virtual object via the display of the wearable head device, wherein the first persistent coordinate data is determined based on a combination of two or more sets of second persistent coordinate data.

15. The method of claim 14, wherein the wearable head device is a first wearable head device, and wherein the method further comprises transmitting the first location data to a second wearable head device.

16. The method of claim 14, wherein the wearable head device is a first wearable head device, and wherein said receiving the first persistent coordinate data comprises receiving the first persistent coordinate data from a second wearable head device.

17. The method of claim 14, wherein the wearable head device is a first wearable head device, and wherein said receiving the relational data comprises receiving the relational data from a second wearable head device.

18. The method of claim 14, further comprising receiving data corresponding to the virtual object.

19. The method of claim 14, wherein the first environment of the wearable head device corresponds to a room.

20. The method of claim 14, wherein the relational data comprises matrix data.

21. A non-transitory computer-readable medium storing instructions which, when executed by one or more processors, cause the one or more processors to perform a method comprising:

receiving, at a wearable head device, first persistent coordinate data, wherein the first persistent coordinate data comprises a transformation matrix relating a virtual coordinate space of a physical environment to a real coordinate space of the physical environment;

receiving, at the wearable head device, relational data, wherein the relational data relates a position to the first persistent coordinate data;

determining, based on input received via one or more sensors of the wearable head device, first location data identifying a first environment of the wearable head device;

determining whether the first persistent coordinate data corresponds to the first environment of the wearable head device;

in accordance with a determination that the first persistent coordinate data corresponds to the first environment of the wearable head device, displaying a virtual object at the position via a display of the wearable head device based on the first persistent coordinate data and based further on the relational data; and in accordance with a determination that the first persistent coordinate data does not correspond to the first environment of the wearable head device, forgoing displaying the virtual object via the display of the wearable head device, wherein the first persistent coordinate data is determined based on a combination of two or more sets of second persistent coordinate data.

22. The non-transitory computer-readable medium of claim 21, wherein the wearable head device is a first wearable head device, and wherein the method further comprises transmitting the first location data to a second wearable head device.

23. The non-transitory computer-readable medium of claim 21, wherein the wearable head device is a first wearable head device, and wherein said receiving the first persistent coordinate data comprises receiving the first persistent coordinate data from a second wearable head device.

24. The non-transitory computer-readable medium of claim 21, wherein the wearable head device is a first wearable head device, and wherein said receiving the relational data comprises receiving the relational data from a second wearable head device.

25. The non-transitory computer-readable medium of claim 21, the method further comprising receiving data corresponding to the virtual object.

26. The non-transitory computer-readable medium of claim 21, wherein the first environment of the wearable head device corresponds to a room.

\* \* \* \* \*